(12) United States Patent
Thatte

(10) Patent No.: US 11,338,266 B2
(45) Date of Patent: May 24, 2022

(54) OXYGEN ABSORBING AND CARBON DIOXIDE EMITTING COMPOSITION

(71) Applicant: Multisorb Technologies, Inc., Buffalo, NY (US)

(72) Inventor: Mrunal R. Thatte, East Amherst, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 405 days.

(21) Appl. No.: 16/427,543

(22) Filed: May 31, 2019

(65) Prior Publication Data

US 2019/0282996 A1    Sep. 19, 2019

Related U.S. Application Data

(63) Continuation of application No. PCT/US2016/064357, filed on Dec. 1, 2016.

(51) Int. Cl.

| B01J 20/22 | (2006.01) |
| C01B 32/50 | (2017.01) |
| B01J 20/02 | (2006.01) |
| B01J 20/32 | (2006.01) |
| B01J 27/053 | (2006.01) |
| B01J 27/10 | (2006.01) |
| C01B 5/00 | (2006.01) |
| B01J 27/043 | (2006.01) |
| B01J 37/04 | (2006.01) |
| B01J 20/20 | (2006.01) |
| B01J 27/055 | (2006.01) |
| B01J 21/04 | (2006.01) |
| B01J 20/14 | (2006.01) |
| B01J 23/70 | (2006.01) |

(52) U.S. Cl.
CPC .......... *B01J 20/22* (2013.01); *B01J 20/0222* (2013.01); *B01J 20/0229* (2013.01); *B01J 20/0237* (2013.01); *B01J 20/0248* (2013.01); *B01J 20/0281* (2013.01); *B01J 20/14* (2013.01); *B01J 20/20* (2013.01); *B01J 20/3204* (2013.01); *B01J 20/3236* (2013.01); *B01J 20/3244* (2013.01); *B01J 21/04* (2013.01); *B01J 23/70* (2013.01); *B01J 27/043* (2013.01); *B01J 27/053* (2013.01); *B01J 27/055* (2013.01); *B01J 27/10* (2013.01); *B01J 37/04* (2013.01); *C01B 5/00* (2013.01); *C01B 32/50* (2017.08); *B01J 2220/46* (2013.01)

(58) Field of Classification Search
CPC .... B01J 20/22; B01J 20/0222; B01J 20/0237; B01J 20/0248; B01J 20/0281; B01J 20/14; B01J 20/20; B01J 20/3204; B01J 20/3236; B01J 20/3244; B01J 21/04; B01J 23/70; B01J 27/043; B01J 27/053; B01J 27/055; B01J 27/10; B01J 37/04; B01J 2220/46; C01B 32/50; C01B 5/00
USPC .......................................................... 502/401
See application file for complete search history.

(56) References Cited

U.S. PATENT DOCUMENTS

| 5,128,060 A | 7/1992 | Ueno |
| 6,447,826 B1 | 9/2002 | Matthews |
| 2005/0205840 A1 | 9/2005 | Farneth |
| 2012/0003424 A1 | 1/2012 | Versteylen |
| 2015/0196022 A1 | 7/2015 | Jensen et al. |

FOREIGN PATENT DOCUMENTS

| JP | S58138368 A | 8/1983 |
| JP | S6094137 A | 5/1985 |
| JP | H0768168 A | 3/1995 |
| JP | H0857307 A | 3/1996 |
| WO | WO2016159985 | 10/2016 |

*Primary Examiner* — Edward M Johnson
(74) *Attorney, Agent, or Firm* — Simpson & Simpson, PLLC

(57) ABSTRACT

A composition that absorbs oxygen and emits carbon dioxide in response to absorbing oxygen including ascorbic acid, an organic acid, a catalyst that promotes oxidation of the organic acid and emission of carbon dioxide and a soluble transition metal salt characterized by multiple oxidation states.

15 Claims, 5 Drawing Sheets

OXYGEN ABSORBING AND CARBON DIOXIDE EMITTING COMPOSITION

CROSS REFERENCE TO RELATED APPLICATIONS

This is a continuation of Int. App. No. PCT/US2016/064357, filed Dec. 1, 2016, which application is incorporated herein by reference in its entirety.

FIELD OF THE INVENTION

The invention broadly relates to oxygen absorbers, more specifically to an oxygen absorbing and carbon dioxide emitting composition, and even more particularly to an oxygen absorbing composition that emits carbon dioxide in response to the absorption of oxygen.

BACKGROUND OF THE INVENTION

Compositions which absorb oxygen and emit carbon dioxide in response to that absorbed oxygen are known in the art. Typically, such compositions are dormant or inactive until activation by moisture. In many instances, these compositions contain an inorganic carbon dioxide source, e.g., carbonate or bicarbonate of alkali or alkaline earth metals acting via formation of carbonic acid by acid-base proton exchange reactions.

There is another class of oxygen absorbing and carbon dioxide emitting compositions known in the art that employs ascorbic acid as part of the composition. Ascorbic acid is a known active substance for oxygen absorption as well as carbon dioxide emission. U.S. Pat. No. 5,128,060 which issued on Jul. 7, 1992 (hereinafter "the '060 Patent') discloses an oxygen absorbent which contains ascorbic acid and/or salts thereof, an alkaline compound such as sodium carbonate, a reaction accelerator such as ferrous sulfate, and silica gel. The '060 Patent further explained that carbonates and hydrogen carbonates are especially preferable, because these salts generate carbon dioxide gas according to the absorption of oxygen in the package so as to improve the preservation of a food by the action of the generated carbon dioxide gas; and maintain the inner pressure of the food package. Particularly preferable alkaline materials are sodium carbonate, potassium carbonate, sodium hydrogen carbonate and potassium hydrogen carbonate. However, when tested, the performance of the compositions disclosed in the '060 Patent was found to have diminished due to the overall formulation of the composition and its resulting pH.

The '060 Patent sets forth a composition including an alkaline compound selected from: an organic acid salt of an alkaline metal; an organic acid salt of an alkaline earth metal; and an organic acid salt of aluminum. It is a general understanding of a person of ordinary skill in the art that an organic acid salt of an alkaline metal, an organic acid salt of an alkaline earth metal and an organic acid salt of aluminum, for the organic acids included in the '060 Patent as well as for organic acids in general, will produce an alkaline solution when dissolved in water. That is, when such salts are dissolved in water at any given concentration, the available concentration of protons will be less than $10^{-7}$ or the concentration of hydroxide ions will be greater than $10^{-7}$.

It has been found that the use of alkaline salts of organic acids, as demonstrated by the composition of the '060 Patent, results in a slower acting material, i.e., slower oxygen absorbing and carbon dioxide emitting. Carbon dioxide is generated from the composition of the '060 Patent from the ascorbic acid itself; however, this mechanism is slow and preferentially occurs when the composition has a high pH value. The foregoing is discussed in greater detail below in relation to a comparison test of the composition of the '060 Patent versus the composition of this application.

BRIEF SUMMARY OF THE INVENTION

In general terms, the present invention comprises a composition that absorbs oxygen and emits carbon dioxide in response to absorbing oxygen. Moreover, an embodiment of the present invention is adjustable insofar as the extent and rate of absorbing oxygen and emitting carbon dioxide can be modified per its intended use. For example, an intended use of absorbing 95% of the oxygen in a 5,000 cubic centimeter container within twenty-four hours is different than absorbing 75% of the oxygen in a 1,000 cubic centimeter container within seventy-two hours. The present invention, in part by modifying its starting pH, may be adjusted to accommodate a variety of uses, e.g., the foregoing intended uses. Furthermore, an embodiment of the present invention's response to changes in pH is in part dependent on the selection of the organic acid included in the composition. For example, a shift from a pH of 5 to a pH of 4 will affect a composition including tartaric acid differently compared to a composition including malic acid. In view of the foregoing, it should be appreciated that for a particular intended use various organic acids and/or various pH values may be used to produce a composition appropriate to satisfy the oxygen absorption and carbon dioxide emission requirements suitable for a particular application.

The present invention broadly comprises a composition that absorbs oxygen and emits carbon dioxide in response to absorbing oxygen. The composition of one embodiment includes ascorbic acid, organic acid, a catalyst that promotes oxidation of the organic acid and emission of carbon dioxide, a base and a soluble transition metal salt characterized by multiple oxidation states.

A further embodiment of the present invention broadly comprises a composition that absorbs oxygen and emits carbon dioxide in response to absorbing oxygen including: ascorbic acid; organic acid; a catalyst that promotes oxidation of the organic acid and emission of carbon dioxide; and a soluble transition metal salt characterized by multiple oxidation states.

A further embodiment of the present invention broadly comprises a method of forming a composition that absorbs oxygen and emits carbon dioxide in response to absorbing oxygen including: a) forming a blended composition by mixing: ascorbic acid; organic acid; a catalyst that promotes oxidation of the organic acid and emission of carbon dioxide; a base; a soluble transition metal salt characterized by multiple oxidation states; and water; and b) coating a carrier with the blended composition.

A further embodiment of the present invention broadly comprises a method of making a composition that absorbs oxygen and emits carbon dioxide in response to absorbing oxygen including: a) blending an initial mixture including: ascorbic acid; organic acid; catalyst that promotes oxidation of the organic acid and emission of carbon dioxide; a soluble transition metal salt characterized by multiple oxidation states; and water.

A further embodiment of the present invention broadly comprises a composition that absorbs oxygen and emits carbon dioxide in response to absorbing oxygen including: an oxygen absorbing material selected from: ascorbic acid; 1,2-dihydroxy aromatics; alpha-hydroxy ketones; and, combinations thereof, the oxygen absorbing material cyclically oxidizes and reduces; organic acid; a catalyst that promotes oxidation of the organic acid and emission of carbon dioxide; and a soluble transition metal salt characterized by multiple oxidation states.

In some aspects of the composition, the organic acid is selected from: ethanedioic acid (oxalic acid) ($H_2C_2O_4$); 2,3-dihydroxybutanedioic acid (tartaric acid) ($C_4H_6O_6$); 2-Hydroxypropanoic acid (lactic acid) ($C_3H_6O_3$); hydroxybutanedioic acid (malic acid) ($C_4H_6O_5$); (Z)-butenedioic acid (maleic acid) ($C_4H_4O_4$); 2-hydroxypropane-1,2,3-tricarboxylic acid (citric acid) ($C_6H_8O_7$); propanedioic acid (malonic acid) ($C_3H_4O_4$); hydrates thereof adducts thereof; and combinations thereof.

In some aspects of the composition the catalyst is selected from: zinc chloride ($ZnCl_2$); aluminum sulfate ($Al_2(SO_4)_3$); magnesium chloride ($MgCl_2$); hydrates thereof; and combinations thereof.

In some aspects, the composition further comprises a base, which may be selected from: sodium hydroxide (NaOH); calcium hydroxide ($Ca(OH)_2$); magnesium hydroxide ($Mg(OH)_2$); and combinations thereof.

In some aspects of the composition, the transition metal salt is selected from: cupric sulfate (copper(II) sulfate) ($CuSO_4$); ferrous sulfate (iron(II) sulfate) ($FeSO_4$); manganese(II) chloride ($MnCl_2$); cobalt(II) chloride ($CoCl_2$); hydrates thereof; adducts thereof; and combinations thereof.

In some aspects, the composition further comprises a promoter selected from: Ethylenediaminetetraacetic Acid, Disodium Salt, Dihydrate (disodium EDTA) ($Na_2EDTA$); Sodium oxalate ($Na_2C_2O_4$); phthalocyanine ($C_{32}H_{18}N_8$); (1R,2R,3S,4S,5R,6S)-cyclohexane-1,2,3,4,5,6-hexayl hexakis[dihydrogen (phosphate)] (phytic acid) ($C_6H_{18}O_{24}P_6$); a salt of phytic acid; a porphyrin; a phthalocyanine; an amino acid; a protein; and combinations thereof.

In some aspects, the composition further comprises a carrier comprising a coating of the ascorbic acid, the organic acid, the alkaline material, the transition metal salt, and the water thereon, and in some aspects the carrier is selected from: diatomaceous earth; silica gel; carbon; and combinations thereof. In some aspects, the carrier is selected from: a sheet; a film; a web; multiple layers thereof; and combinations thereof.

In some aspects, the composition further comprises water.

In some aspects, the composition has a concentration of a base such that a pH of the composition is between about three (3) and about nine and a half (9.5).

In some aspects of the method, the organic acid is selected from: ethanedioic acid (oxalic acid) ($H_2C_2O_4$); 2,3-dihydroxybutanedioic acid (tartaric acid) ($C_4H_6O_6$); 2-Hydroxypropanoic acid (lactic acid) ($C_3H_6O_3$); hydroxybutanedioic acid (malic acid) ($C_4H_6O_5$); maleic acid (maleic acid) ($C_4H_4O_4$); 3-carboxy-3-hydroxypentanedioic acid (citric acid) ($C_6H_8O_7$); propanedioic acid (malonic acid) ($C_3H_4O_4$); hydrates thereof; adducts thereof; and combinations thereof.

In some aspects of the method the catalyst is selected from: zinc chloride ($ZnCl_2$); aluminum sulfate ($Al_2(SO_4)_3$); magnesium chloride ($MgCl_2$); hydrates thereof; and combinations thereof.

In some aspects of the method, the step of mixing comprises mixing a base selected from: sodium hydroxide (NaOH); calcium hydroxide ($Ca(OH)_2$); magnesium hydroxide ($Mg(OH)_2$); and combinations thereof.

In some aspects of the method, the transition metal salt is selected from: cupric sulfate (copper(II) sulfate) ($CuSO_4$); ferrous sulfate (iron(II) sulfate) ($FeSO_4$); manganese(II) chloride ($MnCl_2$); cobalt(II) chloride ($CoCl_2$); and combinations thereof.

In some aspects of the method, the step of mixing comprises mixing a promoter selected from: Ethylenediaminetetraacetic Acid, Disodium Salt, Dihydrate (disodium EDTA) ($Na_2EDTA$); Sodium oxalate ($Na_2C_2O_4$); phthalocyanine ($C_{32}H_{18}N_8$); (1R,2R,3S,4S,5R,6S)-cyclohexane-1,2,3,4,5,6-hexayl hexakis[dihydrogen (phosphate)] (phytic acid) ($C_6H_{18}O_{24}P_6$); a salt of phytic acid; a porphyrin; a phthalocyanine; an amino acid; a protein; and combinations thereof.

In some aspects of the method, the step of mixing comprises mixing water.

In some aspects, the method further includes coating a carrier with the blended composition and drying the coated carrier. In some aspects of the method, the step of drying is performed under vacuum. In some aspects, the method further comprises coating a carrier with the blended composition. In some aspects, the method further comprises mixing the coated carrier with water.

In some aspects of the method, the step of mixing further comprises mixing proportions of the ascorbic acid, the organic acid, the catalyst, the transition metal salt and/or water so that the blended composition has a pH between about three (3) to about nine and a half (9.5).

In some aspects of the method the carrier is selected from: diatomaceous earth; silica gel; carbon; and combinations thereof. In some aspects of the method, the carrier is selected from: a sheet; a film; a web; multiple layers thereof; and combinations thereof.

While the invention is intended to be defined solely by the appended claims, these and other objects and advantages of the present invention will be readily appreciated from the following description of currently preferred embodiments of the invention and from the accompanying drawings.

BRIEF DESCRIPTION OF THE DRAWINGS

The nature and mode of operation of the present invention will now be more fully described in the following detailed description of several embodiments of the invention taken with the accompanying drawing figures, in which.

DETAILED DESCRIPTION OF THE INVENTION

Figure 1:
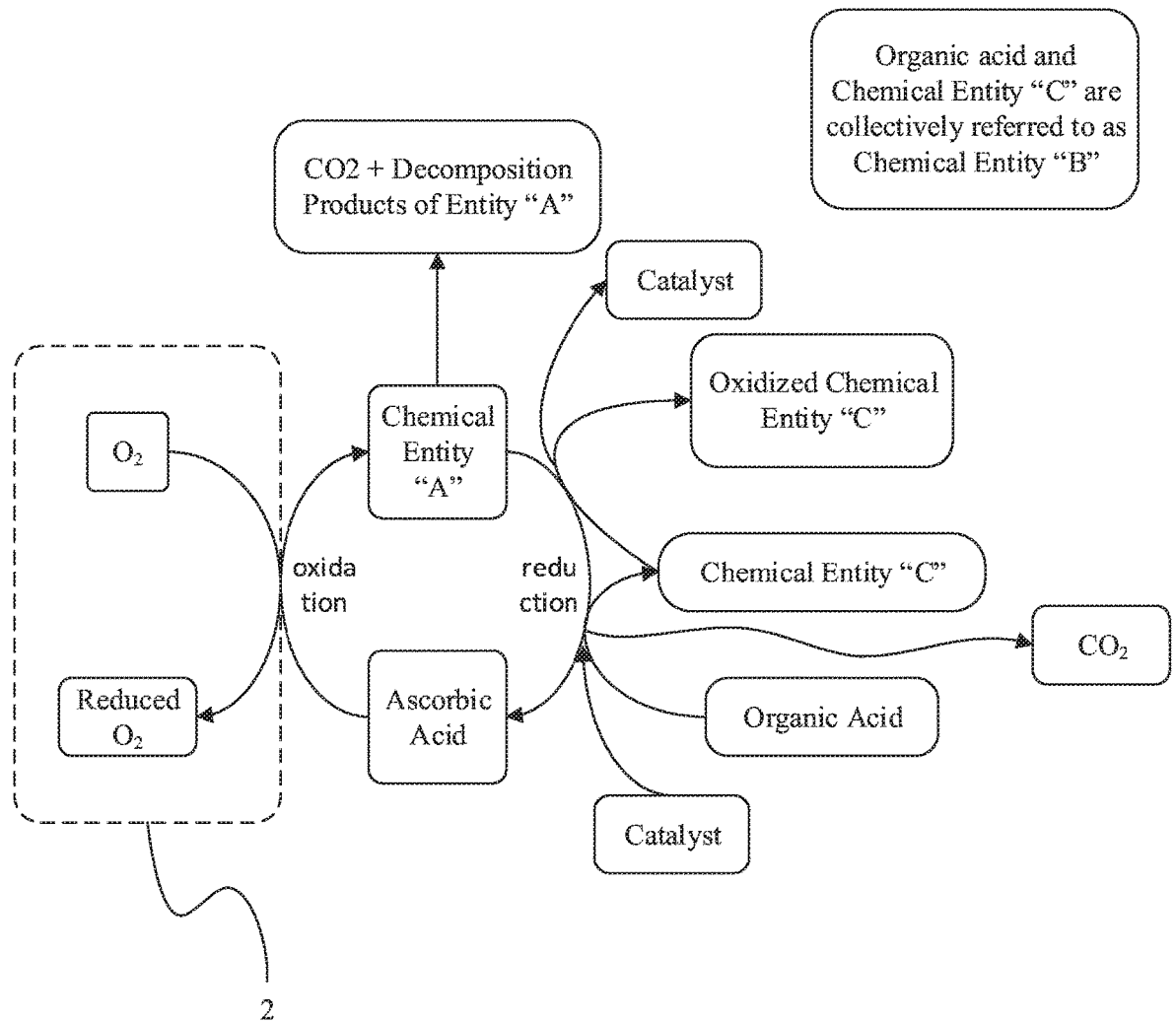
FIG. 1 is a schematic view of a proposed reaction mechanism of the presently disclosed oxygen absorbing and carbon dioxide emitting composition.

At the outset, it should be appreciated that like reference numbers on different drawing views identify identical, or functionally similar, structural elements of various embodiments of the invention. While the present invention is described with respect to what are currently considered to be certain preferred aspects, it is to be understood that the invention as claimed is not limited to the disclosed aspects.

Furthermore, this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. As used herein, "film" is intended to mean a thin layer or sheet of a material, e.g., resin or metal, which typically has a thickness of less than or equal to 0.01 inches, while "sheet" is intended to mean a relatively thin, piece, plate or slab of a material, e.g., resin or metal, which typically has a thickness of greater than 0.01 inches. As used herein, "coat" and "coating" are intended to mean a layer of a first material that covers some or all of a second material, while "coated" is intended to mean that a layer is covering another material, e.g., a sugar-coated corn flake is a corn flake having a layer of sugar deposited thereon. Furthermore, as used herein, a "carrier" is any material exhibiting one or more of following characteristics: 1) porosity; 2) the ability to absorb/adsorb or simply support or carry other ingredients of a composition; 3) enhances the reactivity or the performance outcome of a composition when present as opposed to when not present. For example, a carrier may be zeolite, diatomaceous earth, clay, silica gel, carbon, powdered cellulose, powdered cellulose derivatives or combinations thereof. Moreover, a carrier may be a sheet, a film, a web, a polymer, multiple layers of polymers, or combinations thereof. Further, a carrier may be chemically reactive, partially reactive or completely inert towards the material for which it acts as a carrier.

As used herein, "organic acid" means an acid that is an organic compound and comprises at least one carboxylic acid group. "Ascorbic acid" as used herein means ascorbic acid and its optical and stereo isomers, e.g., erythorbic acid. Moreover, as used herein, a "salt" is a class of chemical compounds that are formed from, an acid and a base by replacement of one or more protons in the acid molecules by cations from the base, and salts may be in the form of hydrates and other complexes, e.g., $CuSO_4$ (salt) and $CuSO_4.5H_2O$ (hydrate of salt). Furthermore, a salt can be a crystalline solid, an amorphous solid or a liquid crystalline compound. A salt can also exist as a liquid or a gas depending on the characteristic physical property of the salt at a given temperature. In addition to existing as a definite chemical entity, salt may be generated in situ by a chemical reaction of a corresponding acid and base. For example, instead of using the salt "MA", equivalent amounts of the base "MOH" and the acid "HA" can be combined in any sequence. In this context, equivalent amounts refer to the weights of the acid and base needed to completely react with one another in accordance with the chemical equation representing a chemical reaction between the acid and base. Additionally, as used herein, a "base" is a hydroxide, a carbonate or a bicarbonate of a metal or of an electropositive element or group. As used herein, "oxygen" means molecular (diatomic) triplet (ground state) oxygen, molecular (diatomic) triplet (excited state) oxygen or molecular (diatomic) singlet (excited state) oxygen.

It should be understood that the use of "or" in the present application is non-exclusive and means and/or unless stated otherwise. For example, when saying that "item x is A or B," it is understood that this can mean either of the following: (1) item x is only one or the other of A and B; (2) item x is both A and B. The word "or" is not used to define an "exclusive or" arrangement. For example, an "exclusive or" arrangement for the statement "item x is A or B" would require that x can be only one of A and B. Furthermore, as used herein, "and/or" is a grammatical conjunction used to indicate that one or more of the elements or conditions recited may be included or occur. For example, a device comprising a first element, a second element, and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Although many methods, devices or materials similar or equivalent to those described herein can be used in the practice or testing of the invention, the preferred methods, devices, and materials are now described.

Generally, the present composition is related to an oxygen absorber and carbon dioxide emitter that remains functionally dormant as an oxygen absorber and carbon dioxide emitter until exposed to molecular (diatomic) triplet (ground state) oxygen, molecular (diatomic) triplet (excited state) oxygen or molecular (diatomic) singlet (excited state) oxygen. Thus, the composition can be prepared and sealed in a barrier bag for an extended period of time without using up any of its intended functionality as an oxygen absorber and carbon dioxide emitter, as long as the barrier bag continues to remain uncompromised, thereby preventing any ingress of oxygen from the outer environment to the composition enclosed within the bag. The intended functionality of the present composition is initiated once the composition is exposed to molecular oxygen either at room temperature or higher, or under refrigerated storage conditions, e.g., in common food, beverage and healthcare product storage conditions.

The present compositions do not rely upon an inorganic source such as sodium carbonate and sodium bicarbonate for the emission of carbon dioxide. The present composition utilizes ascorbic acid in combination with an organic acid to provide oxygen absorption and carbon dioxide emission at greater levels than using ascorbic acid alone. It is believed that the organic acid is responsible for promoting the emission of carbon dioxide. Furthermore, as discussed in greater detail below, a variety of simple organic acids, currently in commercial use in a variety of applications, can be effectively employed in the various embodiments of the present composition. The various embodiments of the present composition provide a substance that absorbs oxygen and emits carbon dioxide in response to absorbing oxygen, and does so more efficiently and rapidly due to maintaining the composition in a pH range of about 3.0 to about 9.5. In particular it has been found that the present composition provides increased functionality at a pH of about 4.0 to about 6.0, and provides optimum functionality at a pH of about 5.0. It should be appreciated that the pH of the present composition affects the performance of the composition, i.e., the rate and extent of oxygen absorption and carbon dioxide emission, and the final pH of the present composition is selected depending on the requirements of its use.

The following section describes the present composition in terms of the individual components that may be included in various embodiments.

Ascorbic Acid

In some embodiments, the present composition comprises ascorbic acid. In some embodiments, the composition comprises at least 0.218 wt % ascorbic acid. In some embodiments, the amount of ascorbic acid present in the composition ranges from 0.218 wt % to about 25.00 wt %; however, higher quantities may also be used. It is believed that the quantity of ascorbic acid necessary to include in the composition is dependent on the quantity of oxygen required to be absorbed and the quantity of carbon dioxide to be emitted. Ascorbic acid is an oxidizable material, commercially available in quantities and costs that are industrially accepted.

Figure 2:
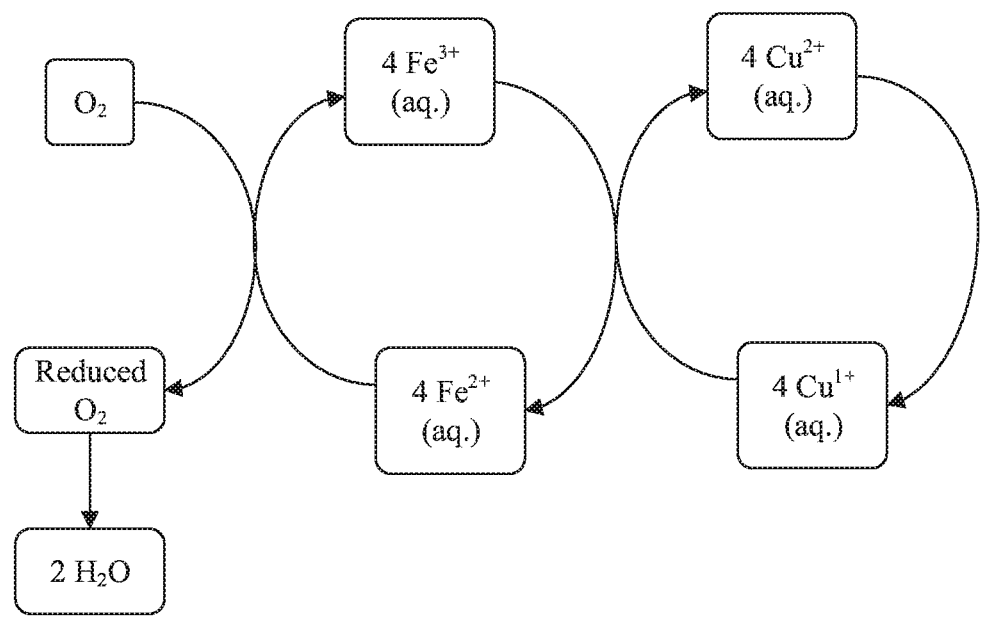
FIG. 2 is a schematic view of the proposed reaction mechanism of the encircled region 2 shown in FIG. 1.

It should be appreciated that one gram of ascorbic acid on its own can absorb about 69-70 cubic centimeters of oxygen at standard temperature and pressure (STP). However, it has been found that ascorbic acid in combination with the other components described herein has a greater capacity to absorb oxygen due to the cyclical nature of the reaction, as depicted in FIGS. 1 and 2.

1,2-dihydroxy Aromatics

Moreover, in some embodiments, the present composition comprises a 1,2-dihydroxy aromatic, e.g., catechol, in combination with an organic acid to result in a composition that absorbs oxygen and emits $CO_2$ in the absence of ascorbic acid. Similar to ascorbic acid, the quantity of 1,2-dihydroxy aromatic included in the composition is dependent on the requirements of oxygen absorption and carbon dioxide emission.

Alpha-hydroxy Ketones

Moreover, in some embodiments, the present composition comprises an alpha-hydroxy ketone, e.g., acetoin, in combination with an organic acid to result in a composition that absorbs oxygen and emits $CO_2$ in the absence of ascorbic acid. Similar to ascorbic acid, the quantity of alpha-hydroxy ketones included in the composition is dependent on the requirements of oxygen absorption and carbon dioxide emission.

Organic Acid

In some embodiments, the present composition comprises an organic acid. In some embodiments, the composition comprises at least 1.84 wt % organic acid. In some embodiments, the amount of organic acid present in the composition ranges from 1.84 wt % to about 17.0 wt %; however, higher or lower quantities may also be used. It is believed that the organic acid acts as a reducing agent. In part, the organic acid is included as it was initially believed to be a practical source of carbon dioxide. However, carbon dioxide emission required testing to prove and evaluate feasibility.

In some embodiments, the organic acid is selected from: ethanedioic acid (oxalic acid) ($H_2C_2O_4$); 2,3-dihydroxybutanedioic acid (tartaric acid) ($C_4H_6O_6$); 2-Hydroxypropanoic acid (lactic acid) ($C_3H_6O_3$); hydroxybutanedioic acid (malic acid) ($C_4H_6O_5$); (Z)-butenedioic acid (maleic acid) ($C_4H_4O_4$); 2-hydroxypropane-1,2,3-tricarboxylic acid (citric acid) ($C_6H_8O_7$); propanedioic acid (malonic acid) ($C_3H_4O_4$); hydrates thereof adducts thereof and, combinations thereof. It is believed that any organic acid comprising at least one carboxylic acid group may be used in the present composition, unless the organic acid inactivates the catalyst itself, for example, by forming a stable insoluble complex. Thus, organic acids that form insoluble complexes with ascorbic acid, ferrous or ferric ions or cuprous or cupric ions should not be used. In the absence of an organic acid as defined herein, the cycle of oxygen absorption and carbon dioxide emission is not completed.

Catalyst

In some embodiments, the present composition comprises a catalyst which promotes oxidation of the organic acid. In some embodiments, the composition comprises about 3.25 wt % catalyst. In some embodiments, the amount of catalyst present in the composition is an amount of at least 0.1 wt %; however, higher quantities may also be used. The catalyst is used in a catalytic amount such that the amount of catalyst included in a given composition is dependent on a variety of factors, including but not limited to: the amount of ascorbic acid included in the composition; the chemical nature of catalyst used; the solubility of the catalyst; the catalytic effect of the catalyst; and, the amount of oxygen to be scavenged and carbon dioxide to be emitted. In part, the catalyst is included to catalyze the reaction between Chemical Entity "A" and the organic acid as depicted in FIG. 1. Aluminum sulfate was included in some embodiments as a source of aluminum ions which can function as a Lewis acid catalyst.

In some embodiments, the catalyst is selected from: zinc chloride ($ZnCl_2$); aluminum sulfate ($Al_2(SO_4)_3$); magnesium chloride ($MgCl_2$); hydrates thereof; and, combinations thereof. Additionally, the catalyst can also be a salt of Zinc, Aluminum or Magnesium with other anions, for example, nitrate, and hydrates thereof.

Base

In some embodiments, the present composition comprises a base. In some embodiments, the composition comprises about 15.0 wt % base. In some embodiments, the amount of base present in the composition ranges from 3.2 wt % to about 15.0 wt %; however, higher or lower quantities may also be used. The quantity of base necessary is dependent on the quantities of ascorbic acid and organic acid. For example, a higher amount of ascorbic acid and organic acid will require a higher amount of base to tune the final pH to an optimum value.

In some embodiments, the base is selected from: sodium hydroxide (NaOH); potassium hydroxide (KOH); calcium hydroxide ($Ca(OH)_2$); magnesium hydroxide ($Mg(OH)_2$); sodium carbonate ($Na_2CO_3$); sodium bicarbonate ($NaHCO_3$); and, combinations thereof.

Soluble Transition Metal Salt

In some embodiments, the present composition comprises a soluble transition metal salt characterized by multiple oxidation states. As used herein, multiple oxidation states means two or more oxidation states in addition to the unoxidized state. In some embodiments, the composition comprises about 2.2 wt % soluble transition metal salt. In some embodiments, the amount of soluble transition metal salt present in the composition in an amount of at least 0.1 wt %; however, higher quantities may also be used. The amount of soluble transition metal salt included in the composition is dependent on a variety of factors, including but not limited to: the amount of ascorbic acid included in the composition; the type of soluble transition metal salt used; the solubility of the soluble transition metal salt; and, the amount of oxygen to be scavenged and carbon dioxide to be emitted. In part, the soluble transition metal salt is included to act as a red-ox catalyst, e.g., as a source of cupric and/or ferrous ions.

In some embodiments, the soluble transition metal salt is selected from: cupric sulfate (copper(II) sulfate) ($CuSO_4$); ferrous sulfate (iron(II) sulfate) ($FeSO_4$); manganese(II) chloride ($MnCl_2$); cobalt(II) chloride ($CoCl_2$); hydrates thereof; adducts thereof and, combinations thereof. Additionally, the soluble transition metal salt can also be a salt of Copper, Iron, Manganese or Cobalt with other anions, for example, nitrate; hydrates thereof and, combinations thereof.

Promoter

In some embodiments, the present composition comprises a promoter. In some embodiments, the composition comprises about 2.16 wt % promoter. In some embodiments, the amount of promoter present in the composition in an amount of at least 0.1 wt %; however, higher quantities may also be used. The amount of promoter included in the composition is dependent on a variety of factors, including but not limited to: the amount of ascorbic acid included in the composition; the type of promoter used; the solubility of the promoter; and, the amount of oxygen to be scavenged and carbon dioxide to be emitted. In part, the promoter is included as it complexes with dissolved metal ions to form soluble complexes.

In some embodiments, the promoter is selected from: Ethylenediaminetetraacetic Acid, Disodium Salt, Dihydrate (disodium EDTA) ($Na_2EDTA$); Sodium oxalate ($Na_2C_2O_4$); phthalocyanine ($C_{32}H_{18}N_8$); (1R,2R,3S,4S,5R,6S)-cyclohexane-1,2,3,4,5,6-hexayl hexakis[dihydrogen (phosphate)] (phytic acid) ($C_6H_{18}O_{24}P_6$); a salt of phytic acid; a porphyrin; a phthalocyanine; an amino acid; a protein; and, combinations thereof. Generally, the materials listed are polydentate ligands and are well known to form coordination compounds with the dissolved transition metal. It is believed that the resulting metal-ligand complex stabilizes and favors a metal's ability to play a catalytic role. Examples of suitable porphyrins include but are not limited to 2,3,7,8,12,13,17,18-Octaethyl-21H,23H-porphine and 4,4',4'',4'''-(Porphine-5,10,15,20-tetrayl)tetrakis(benzoic acid). Examples of suitable phthalocyanines include but are not limited to 1,4,8,11,15,18,22,25-Octabutoxy-29H,31H-phthalocyanine and phthalocyanine-3,4',4'',4'''-tetrasulfonic acid tetrasodium salt. Example of suitable amino acids includes but is not limited to glycine, proline, serine, lysine and glutamic acid. Examples of suitable proteins includes but is not limited to laccase, myoglobin, hemoglobin, hemerythrin, and chlorophyll containing proteins. All promoters may be used alone or in combination with each other.

Water

In some embodiments, the present composition comprises water. In some embodiments, the amount of water present in the composition ranges from 35.00 wt % to about 92.6 wt %; however, higher quantities may also be used. The amount of water included in the composition must be sufficient to permit adequate mobility of the molecules in the composition to interact with each other. In some embodiments, water is included as a solvent since all components are soluble in water. In some embodiments, water in combination with water miscible organic liquid may be used, e.g., water in combination with ethanol. In some embodiments, a solution or stable suspension of a solid organic or inorganic chemical compound in water may be used, e.g., a suspension of a solid organic or inorganic chemical compound in water is produced when a solid organic or inorganic chemical compound is used at a quantity greater than the solubility limit for that compound in the embodiment. Another example is when the solubility limit of a solid organic or inorganic chemical compound is altered, specifically lowered by the addition of a water miscible organic liquid, for example ethanol.

Carrier

In some embodiments including water, the present composition may further comprise a carrier comprising a coating of the ascorbic acid, the organic acid, the alkaline material, the soluble transition metal salt and the water thereon. In some embodiments, the carrier is selected from: zeolite; diatomaceous earth; clay; silica gel; carbon; powdered cellulose, powdered cellulose derivatives; and, combinations thereof. Some carriers of this type provide superior surface area for faster interaction between the adsorbed solution and gaseous molecular (diatomic) triplet (ground state) oxygen, molecular (diatomic) triplet (excited state) oxygen or molecular (diatomic) singlet (excited state) oxygen. In some embodiments, the carrier is selected from: a sheet; a film; a web; a polymer; multiple layers of polymers; and, combinations thereof.

The following is best understood in view of FIG. 1. It is believed that the functional mode of operation of the present composition is indicative of certain trends upon which a functioning model can be proposed. Based on the results disclosed herein, it is proposed that there are two different chemical processes concurrently existing while the present composition is absorbing oxygen and emitting carbon dioxide. The first chemical process absorbs oxygen and the second chemical process emits carbon dioxide. These chemical processes to some extent rely on each other for their respective functionality, and in this fashion, it is believed that the processes work in tandem. However, in order that the second chemical process can occur, the first process is required to have taken place. Thus, the present composition must absorb oxygen before the carbon dioxide emitting process can occur within the composition.

It is believed that ascorbic acid in the present composition first absorbs oxygen while undergoing a chemical change to a chemical entity designated as Chemical Entity "A". As one of several possibilities, it is believed that Chemical Entity "A" is likely dehydroascorbic acid, in its hydrated form or diketo form. Molecular oxygen interacts with the ascorbic acid to form reduced oxygen, and it is believed that this interaction is catalytically driven by the presence of a salt of iron and/or copper. FIG. 2 generally depicts the interaction. Based on the results disclosed herein, it is also believed that Chemical Entity "A" interacts with the organic acid in the present composition, thereby resulting in the emission of carbon dioxide from the composition and the conversion of Chemical Entity "A" back to ascorbic acid. The amount of oxygen absorbed compared to the amount of ascorbic acid present in the composition is suggestive of cyclical catalytic oxygen scavenging by ascorbic acid. In the catalytic scavenging of oxygen, ascorbic acid is first oxidized by molecular oxygen and then the oxidized form of ascorbic acid is reduced back to ascorbic acid by Chemical Entity "B". This interaction is believed to be catalytically driven by the presence of a salt of aluminum, magnesium and/or zinc. Although the specific identity of Chemical Entity "B" is not known, it is believed that Chemical Entity "B" may be the organic acid itself or any one of a number of unknown chemical entities collectively designated herein as Chemical Entity "C". Chemical Entity "C" is believed to be generated during the chemical conversion of organic acid which in turn leads to the emission of carbon dioxide. In short, it is believed that the combination of the ascorbic acid with the organic acid provides a catalyzed cyclical carbon dioxide generating cycle. Moreover, it is believed that the organic acid is consumed during the foregoing reactions and is therefore the limiting factor in the overall reaction, i.e., absorption of oxygen and emission of carbon dioxide. Oxygen absorption and carbon dioxide emission may continue to occur at reduced levels due to the ascorbic acid alone.

Figure 3:
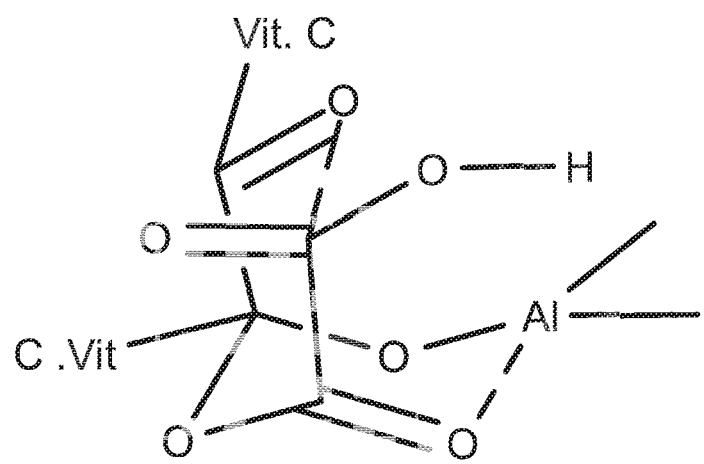
FIG. 3 is a structural diagram of a first proposed intermediate of oxalic acid interacting with dehydroascorbic acid to generate carbon dioxide when aluminum is present.
Figure 4:
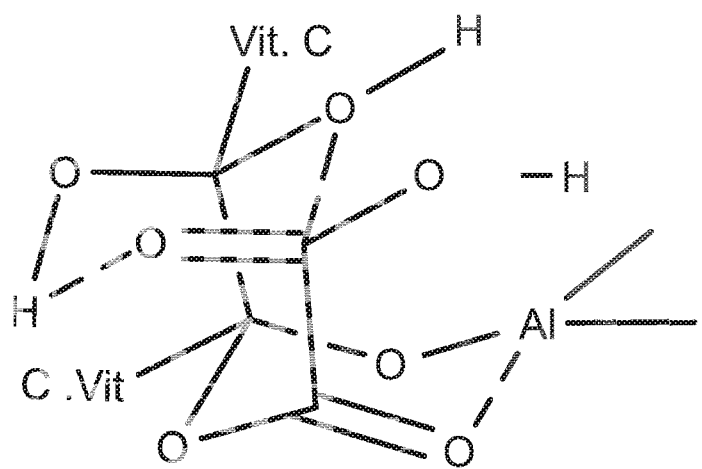
FIG. 4 is a structural diagram of a second proposed intermediate of oxalic acid interacting with dehydroascorbic acid to generate carbon dioxide when aluminum is present.
Figure 5:
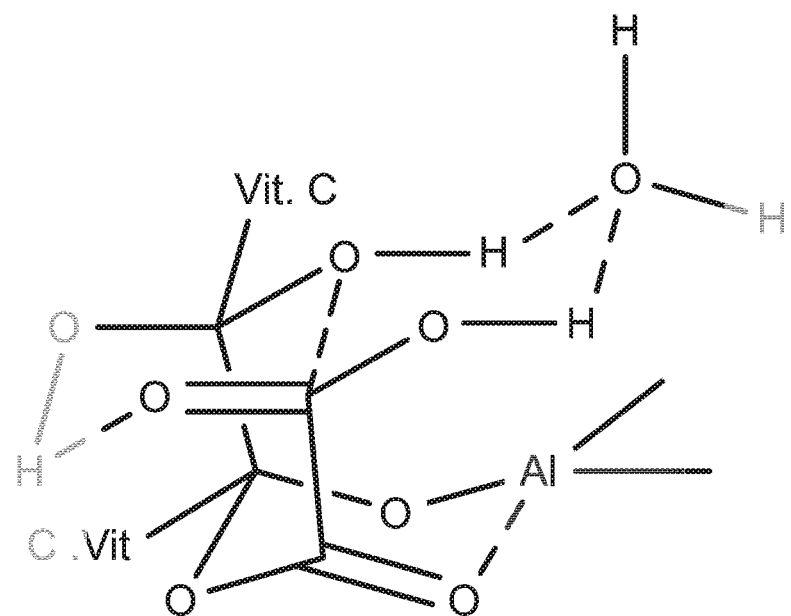
FIG. 5 is a structural diagram of a third proposed intermediate of oxalic acid interacting with dehydroascorbic acid to generate carbon dioxide when aluminum is present.
Figure 6:
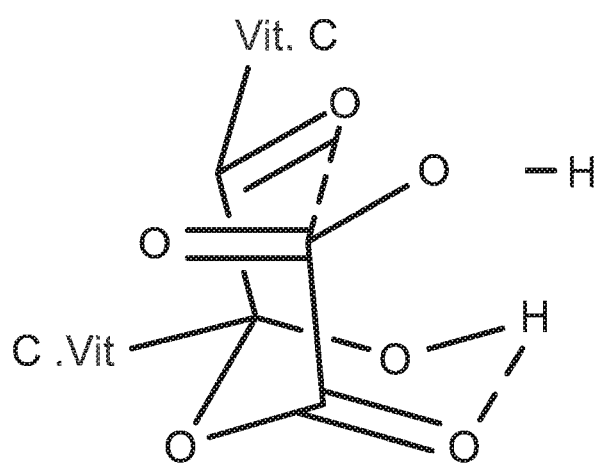
FIG. 6 is a structural diagram of a first proposed intermediate of oxalic acid interacting with dehydroascorbic acid to generate carbon dioxide when aluminum is not present.
Figure 7:
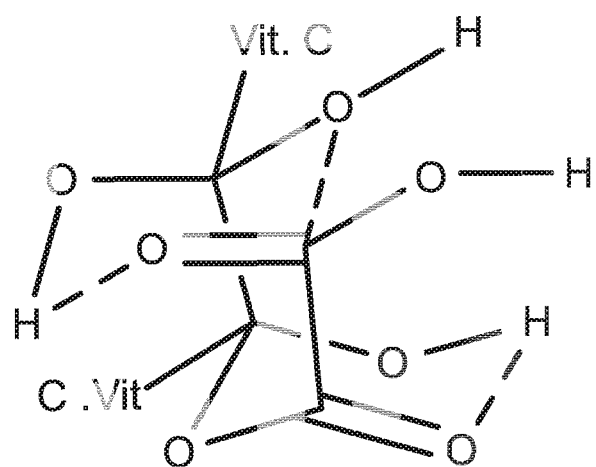
FIG. 7 is a structural diagram of a second proposed intermediate of oxalic acid interacting with dehydroascorbic acid to generate carbon dioxide when aluminum is not present; and, FIG. 8 is a structural diagram of a third proposed intermediate of oxalic acid interacting with dehydroascorbic acid to generate carbon dioxide when aluminum is not present.
Figure 8:
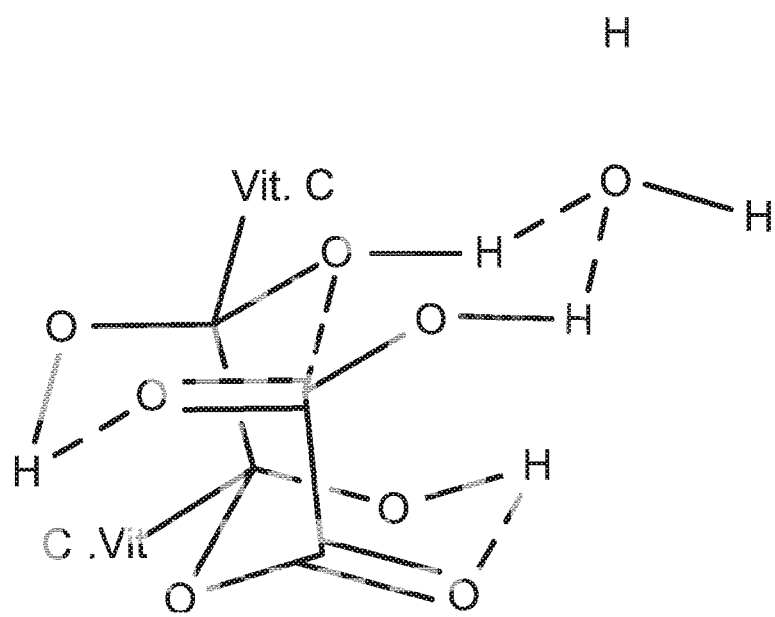

It is believed that when, for example, oxalic acid interacts with dehydroascorbic acid to generate carbon dioxide, that the reaction course passes through various reactive intermediates, three of which are proposed and structurally depicted in FIGS. 3, 4 and 5. Under an alkaline medium, the protons that hold the transient 6-membered rings together are taken away by the reaction with alkali. This interferes with the formation of the proposed intermediate and therefore results in a reduced production of carbon dioxide than when an alkaline medium is completely absent, i.e., a pH of less than seven. Another reason high alkalinity affects the efficiency of the reaction is by precipitating out the metal as their respective hydroxides or oxides. In the absence of the dissolved metal acting as a catalyst, due to its precipitation, the reaction does not proceed to the same extent as when the dissolved metal is present. Moreover, the reversibility of the present reaction is favored by the acidic condition of the medium. In view of the foregoing, a medium resulting in a pH range of less than or equal to seven is preferred. It should be appreciated that as used in this context, the "reversibility" of the present reaction is intended to describe that the ascorbic acid is converted to Chemical Entity "A" and is subsequently converted back to ascorbic acid.

It has been found that the ratio of oxygen absorbed to carbon dioxide generated can be adjusted by varying the organic acid and water quantities.

A variety of sample compositions was prepared and their respective performances quantified, i.e., the quantities of oxygen absorbed and carbon dioxide emitted. It should be appreciated that all tables describing the quantities of oxygen and carbon dioxide present at a particular time are describing those amounts as percentages by volume of each particular component.

EXAMPLES

The compositional breakdowns of Samples 1-5 are included in Table 1 herebelow.

TABLE 1

| | Sample No. | | | | |
|---|---|---|---|---|---|
| | 1 | 2 | 3 | 4 | 5 |
| NaOH (g) | 6.40 | 4.80 | 3.20 | 1.60 | 0.00 |
| Ascorbic Acid (g) | 3.52 | 3.52 | 3.52 | 3.52 | 3.52 |
| Oxalic Acid (g) | 1.8 | 1.8 | 1.8 | 1.8 | 1.8 |
| $CuSO_4$ (g) | 0.05 | 0.05 | 0.05 | 0.05 | 0.05 |

TABLE 1-continued

| | Sample No. | | | | |
|---|---|---|---|---|---|
| | 1 | 2 | 3 | 4 | 5 |
| $FeSO_4$ (g) | 0.06 | 0.06 | 0.06 | 0.06 | 0.06 |
| Water (g) | 28.17 | 29.77 | 31.37 | 32.97 | 34.57 |
| Net Solution (g) | 40 | 40 | 40 | 40 | 40 |
| $Na_2EDTA$ (g) | 0.2 | 0.2 | 0.2 | 0.2 | 0.2 |
| Total Weight (g) | 40.2 | 40.2 | 40.2 | 40.2 | 40.2 |

Twenty-five (25) grams (g) of each of Samples 1-5 were sealed in separate barrier bags containing 1,000 cubic centimeters (cc) of air. The change in oxygen and carbon dioxide was monitored as a function of time. The reduction in carbon dioxide levels at 146 hours is believed to be due to the dissolution of gas in the liquid medium. Moreover, the readings of carbon dioxide levels taken at 146 hours were performed using a different device, i.e., a portable reader. Samples 1-5 indicate that a preferred molar ratio between NaOH and oxalic acid is about 2:1, a more preferred ratio is about 0:1, and a most preferred ration is about 1:1. The results of Samples 1-5 are included in Table 2 herebelow.

TABLE 2

| | 0 hrs | | 27 hrs | | 120 hrs | | 146 hrs | |
|---|---|---|---|---|---|---|---|---|
| Sample No. | $O_2$ | $CO_2$ | $O_2$ | $CO_2$ | $O_2$ | $CO_2$ | $O_2$ | $CO_2$ |
| 1 | 20.4 | 0 | 13.9 | 0 | 4.32 | 0 | 3.19 | 0 |
| 2 | 20.4 | 0 | 12.3 | 0 | 2.18 | 0 | 2.51 | 0 |
| 3 | 20.4 | 0 | 10 | 0 | 0.952 | 0.2 | 0.77 | 0.15 |
| 4 | 20.4 | 0 | 17.6 | 1.4 | 12 | 8 | 10.39 | 7.52 |
| 5 | 20.4 | 0 | 19.4 | 0.2 | 18.1 | 0.7 | 17.66 | 0.8 |

The compositional breakdowns of Samples 6-11 are included in Table 3 herebelow.

TABLE 3

| | Sample No. | | | | | |
|---|---|---|---|---|---|---|
| | 6 | 7 | 8 | 9 | 10 | 11 |
| NaOH (g) | 1.60 | 1.60 | 1.60 | 1.60 | 1.60 | 1.60 |
| Ascorbic Acid (g) | 3.52 | 3.52 | 3.52 | 3.52 | 3.52 | 3.52 |
| Oxalic Acid (g) | 2.52 | 2.52 | 2.52 | 2.52 | 2.52 | 2.52 |
| $CuSO_4$ (g) | 0.05 | 0.05 | 0.05 | 0.05 | 0.05 | 0.05 |
| $FeSO_4$ (g) | 0.06 | 0.06 | 0.06 | 0.06 | 0.06 | 0.06 |
| Water (g) | 32.25 | 32.25 | 32.25 | 32.25 | 32.25 | 32.25 |
| Net Solution (g) | 40 | 40 | 40 | 40 | 40 | 40 |
| Water (g) | 0.5 | | | | | 0.1 |
| $ZnCl_2$ (g) | | 0.5 | | | | 0.1 |
| $Al_2(SO_4)_3$ (g) | | | 0.5 | | | 0.1 |
| $MnCl_2$ (g) | | | | 0.5 | | 0.1 |
| $MgCl_2$ (g) | | | | | 0.5 | 0.1 |
| Total Weight (g) | 40.5 | 40.5 | 40.5 | 40.5 | 40.5 | 40.5 |

Twenty-five (25) grams (g) of each of Samples 6-11 were sealed in separate barrier bags containing 1,000 cubic centimeters (cc) of air. The change in oxygen and carbon dioxide was monitored as a function of time. Samples 6-11 indicate that a preferred composition includes $Al_2(SO_4)_3$ at about 1.25 wt % of the solution. The results of Samples 6-11 are included in Table 4 herebelow.

TABLE 4

| Sample No. | 0 hrs $O_2$ | 0 hrs $CO_2$ | 96 hrs $O_2$ | 96 hrs $CO_2$ | 146 hrs $O_2$ | 146 hrs $CO_2$ |
|---|---|---|---|---|---|---|
| 6 | 20.4 | 0 | 15.65 | 3.25 | 13.86 | 5.36 |
| 7 | 20.4 | 0 | 16.22 | 2.79 | 14.23 | 4.65 |
| 8 | 20.4 | 0 | 15.2 | 3.13 | 13.37 | 4.98 |
| 9 | 20.4 | 0 | 16.68 | 2.49 | 14.6 | 4.3 |
| 10 | 20.4 | 0 | 16.14 | 2.76 | 14.14 | 4.66 |
| 11 | 20.4 | 0 | 16.54 | 2.59 | 14.94 | 4.24 |

The compositional breakdowns of Samples 12-17 are included in Table 5 herebelow.

TABLE 5

| | Sample No. | | | | | |
|---|---|---|---|---|---|---|
| | 12 | 13 | 14 | 15 | 16 | 17 |
| NaOH (g) | 1.60 | 1.60 | 1.60 | 1.60 | 1.60 | 1.60 |
| Ascorbic Acid (g) | 3.52 | 3.52 | 3.52 | 3.52 | 3.52 | 3.52 |
| Oxalic Acid (g) | 1.8 | | | | | |
| Tartaric (g) | | 2.14 | | | | |
| Lactic (g) | | | 2.57 | | | |
| Malic (g) | | | | 1.91 | | |
| Citric (g) | | | | | 1.83 | |
| Malonic (g) | | | | | | 1.49 |
| $CuSO_4$ (g) | 0.05 | 0.05 | 0.05 | 0.05 | 0.05 | 0.05 |
| $FeSO_4$ (g) | 0.06 | 0.06 | 0.06 | 0.06 | 0.06 | 0.06 |
| Water (g) | 32.97 | 32.63 | 32.2 | 32.86 | 32.94 | 33.28 |
| Net Solution (g) | 40 | 40 | 40 | 40 | 40 | 40 |
| $Al_2(SO_4)_3$ (g) | 0.5 | 0.5 | 0.5 | 0.5 | 0.5 | 0.5 |
| Total Weight (g) | 40.5 | 40.5 | 40.5 | 40.5 | 40.5 | 40.5 |

Ten (10) grams (g) of each of Samples 12-17 were mixed with ten (10) grams of diatomaceous earth (average particle size 8 microns) and sealed in separate barrier bags containing 2,500 cubic centimeters (cc) of air comprising about 6% oxygen. The change in oxygen and carbon dioxide was monitored as a function of time. Samples 12-17 indicate that a preferred organic acid used in the present composition is oxalic acid, more preferred organic acids are lactic acid and malonic acid, while the most preferred organic acids are citric acid, malic acid and tartaric acid. The results of Samples 12-17 are included in Table 6 herebelow.

TABLE 6

| Sample No. | 0 hrs $O_2$ | 0 hrs $CO_2$ | 5 hrs $O_2$ | 5 hrs $CO_2$ | 24 hrs $O_2$ | 24 hrs $CO_2$ | 120 hrs $O_2$ | 120 hrs $CO_2$ | 144 hrs $O_2$ | 144 hrs $CO_2$ |
|---|---|---|---|---|---|---|---|---|---|---|
| 12 | 5.82 | 0 | 4.82 | 0.4 | 3.56 | 1.5 | 1.65 | 4.3 | 1.37 | 4.6 |
| 13 | 5.83 | 0 | 2.41 | 1.7 | 0.28 | 4.4 | 0 | 6.9 | 0 | 6.9 |
| 14 | 5.8 | 0 | 2.57 | 1.4 | 0.927 | 3 | 0 | 5.8 | 0 | 5.8 |
| 15 | 5.82 | 0 | 2.66 | 1.6 | 0.473 | 4.2 | 0 | 6.7 | 0 | 6.7 |
| 16 | 5.8 | 0 | 2.86 | 1.3 | 0.624 | 4.1 | 0 | 6.3 | 0 | 6.3 |
| 17 | 5.81 | 0 | 3.16 | 1.1 | 1.47 | 2.8 | 0 | 5.8 | 0 | 5.8 |

The compositional breakdowns of Samples 18-20 are included in Table 7 herebelow.

TABLE 7

| | Sample No. | | |
|---|---|---|---|
| | 18 | 19 | 20 |
| NaOH (g) | 1.60 | 1.60 | 1.60 |
| Ascorbic Acid (g) | 3.52 | 3.52 | 3.52 |
| Oxalic Acid (g) | 1.8 | | |
| Tartaric (g) | | 2.14 | |
| $KHSO_4$ (g) | | | 3.89 |
| $CuSO_4$ (g) | 0.05 | 0.05 | 0.05 |
| $FeSO_4$ (g) | 0.06 | 0.06 | 0.06 |
| Water (g) | 32.97 | 32.63 | 30.88 |
| Net Solution (g) | 40 | 40 | 40 |
| $Al_2(SO_4)_3$ (g) | 0.5 | 0.5 | 0.5 |
| Total Weight (g) | 40.5 | 40.5 | 40.5 |

Ten (10) grams (g) of each of Samples 18-20 were mixed with ten (10) grams of diatomaceous earth (average particle size 8 microns) and sealed in separate barrier bags containing 2,500 cubic centimeters (cc) of ambient air comprising about 20% oxygen. The change in oxygen and carbon dioxide was monitored as a function of time. Samples 18-20 indicate that tartaric acid is preferred over oxalic acid, and that tartaric acid is preferred to an to inorganic acid such as potassium bisulfate. The results of Samples 18-20 are included in Table 8 herebelow.

TABLE 8

| | 0 hrs | | 96 hrs | | 120 hrs | | 240 hrs | | 336 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 18 | 19.8 | 0 | 15.5 | 3.5 | 15 | 4 | 13.7 | 5.5 | 13.2 | 6.1 |
| 19 | 19.6 | 0 | 9.65 | 8.5 | 8.9 | 9.4 | 7.01 | 11.7 | 6.14 | 12.8 |
| 20 | 19.6 | 0 | 15.4 | 2.5 | 15 | 2.9 | 13.5 | 4.4 | 12.7 | 5.4 |

| | 384 hrs | | 504 hrs | |
|---|---|---|---|---|
| Sample No. | $O_2$ | $CO_2$ | $O_2$ | $CO_2$ |
| 18 | 12.6 | 6.7 | 12.6 | 6.7 |
| 19 | 5.02 | 13.7 | 5.02 | 13.7 |
| 20 | 11.7 | 6.4 | 11.7 | 6.4 |

The compositional breakdowns of Samples 21-24 are included in Table 9 herebelow.

TABLE 9

| | Sample No. | | | |
|---|---|---|---|---|
| | 21 | 22 | 23 | 24 |
| NaOH (g) | 1.60 | 2.74 | 3.88 | 5.02 |
| Ascorbic Acid (g) | 3.52 | 3.52 | 3.52 | 3.52 |
| Tartaric (g) | 2.14 | 4.28 | 6.42 | 8.56 |
| $CuSO_4$ (g) | 0.05 | 0.05 | 0.05 | 0.05 |
| $FeSO_4$ (g) | 0.06 | 0.06 | 0.06 | 0.06 |
| Water (g) | 42.63 | 39.35 | 36.07 | 32.79 |
| Net Solution (g) | 52.43 | 50 | 50 | 50 |
| $Al_2(SO_4)_3$ (g) | 0.5 | 0.5 | 0.5 | 0.5 |
| Total Weight (g) | 52.99 | 50.5 | 50.5 | 50.5 |

Ten (10) grams (g) of each of Samples 21-24 were mixed with ten (10) grams of diatomaceous earth (average particle size 8 microns) and sealed in separate barrier bags containing 5,000 cubic centimeters (cc) of ambient air comprising about 20% oxygen. The change in oxygen and carbon dioxide was monitored as a function of time. Samples 21-24 indicates that the performance of the present composition improves as the weight percent of tartaric acid increases; however, a maximum weight percent was not determined. The results of Samples 21-24 are included in Table 10 herebelow.

TABLE 10

| Sample No. | 0 hrs | | 2 hrs | | 20 hrs | | 27 hrs | | 120 hrs | |
|---|---|---|---|---|---|---|---|---|---|---|
| | $O_2$ | $CO_2$ | $O_2$ | $CO_2$ | $O_2$ | $CO_2$ | $O_2$ | $CO_2$ | $O_2$ | $CO_2$ |
| 21 | 19.6 | 0 | 18.5 | 0.4 | 17.9 | 1.1 | 17.6 | 1.3 | 15.6 | 3.4 |
| 22 | 19.5 | 0 | 18.3 | 0.7 | 16.7 | 2.3 | 16.3 | 2.7 | 14 | 5.2 |
| 23 | 19.5 | 0 | 17.9 | 1.1 | 15.6 | 3.4 | 15.1 | 3.8 | 12.9 | 6.4 |
| 24 | 19.6 | 0 | 17.6 | 1.5 | 14.9 | 4.2 | 14.4 | 4.7 | 12.4 | 7 |

| Sample No. | 216 hrs | | 384 hrs | |
|---|---|---|---|---|
| | $O_2$ | $CO_2$ | $O_2$ | $CO_2$ |
| 21 | 14.7 | 4.2 | 14 | 5 |
| 22 | 13.2 | 6 | 12.7 | 6.6 |
| 23 | 12.1 | 7 | 11.8 | 7.4 |
| 24 | 11.7 | 7.5 | 11.4 | 7.9 |

The compositional breakdowns of Samples 25-31 are included in Table 11 herebelow.

TABLE 11

| | Sample No. | | | | | | |
|---|---|---|---|---|---|---|---|
| | 25 | 26 | 27 | 28 | 29 | 30 | 31 |
| NaOH (g) | 1.60 | 0.46 | | 1.60 | 1.60 | 1.60 | 1.60 |
| Enediol (g) | 3.52 (AA) | 3.52 (AA) | | 3.52 (AA) | 3.52 (AA) | 2.20 (Catechol) | 1.76 (Acetoin) |
| Tartaric (g) | 2.14 | | 2.14 | 2.14 | 2.14 | 2.14 | 2.14 |
| $CuSO_4$ (g) | 0.05 | 0.05 | 0.05 | | 0.05 | 0.05 | 0.05 |
| $FeSO_4$ (g) | 0.06 | 0.06 | 0.06 | | 0.06 | 0.06 | 0.06 |
| Water (g) | 42.63 | 45.34 | 47.75 | 42.74 | 42.63 | 43.95 | 44.39 |
| Net Solution (g) | 50 | 50 | 50 | 50 | 50 | 50 | 50 |
| $Al_2(SO_4)_3$ (g) | | | | | 0.5 | | |
| Total Weight (g) | 50 | 50 | 50 | 50 | 50.5 | 50 | 50 |

Ten (10) grams (g) of each of Samples 25-31 were mixed with ten (10) grams of diatomaceous earth (average particle size 8 microns) and sealed in separate barrier bags containing 2,000 cubic centimeters (cc) of ambient air comprising about 20% oxygen. The change in oxygen and carbon dioxide was monitored as a function of time. Samples 25-31 were composed to consider a variety of factors including the nature of the compound interacting with oxygen. In addition to ascorbic acid (enediol), catechol (1,2 dihydroxy phenol) and acetoin (alpha-hydroxy ketone) were tested as oxygen absorbing materials. The results set forth below indicate that: a preferred embodiment of the present composition comprises $Al_2(SO_4)_3$; a preferred embodiment of the present composition comprises an organic acid; presence of copper and iron salts is not necessary, however, performance is improved by their presence; an embodiment of the present composition comprising an enediol performs better than an embodiment devoid of an enediol; and, ascorbic acid, an enediol, performed better than other enediols. The results of Samples 25-31 are included in Table 12 herebelow.

TABLE 12

| Sample No. | 0 hrs | | 72 hrs | | 168 hrs | | 336 hrs | |
|---|---|---|---|---|---|---|---|---|
| | $O_2$ | $CO_2$ | $O_2$ | $CO_2$ | $O_2$ | $CO_2$ | $O_2$ | $CO_2$ |
| 25 | 19.4 | 0 | 12.6 | 6 | 10.5 | 8.6 | 8.98 | 10.2 |
| 26 | 19.7 | 0 | 14.9 | 2.4 | 13.4 | 3.6 | 12.9 | 4.7 |
| 27 | 20.1 | 0 | 19.6 | 0.1 | 19.4 | 0.3 | 18.6 | 0.6 |
| 28 | 19.8 | 0 | 12.7 | 5.7 | 10.4 | 8.2 | 9.06 | 9.7 |
| 29 | 19.4 | 0 | 11.1 | 6.9 | 7.89 | 10.3 | 6.13 | 12.4 |
| 30 | 19.3 | 0 | 14.5 | 2 | 13.3 | 2.3 | 12.6 | 2.7 |
| 31 | 19.4 | 0 | 17.1 | 0.1 | 15.5 | 0.1 | 15.2 | 0.5 |

| Sample No. | 408 hrs | | 504 hrs | |
|---|---|---|---|---|
| | $O_2$ | $CO_2$ | $O_2$ | $CO_2$ |
| 25 | 8.69 | 10.4 | 8.38 | 11 |
| 26 | 12.7 | 4.9 | 12.3 | 5.2 |
| 27 | 18.5 | 0.7 | 18.2 | 1 |
| 28 | 8.85 | 9.8 | 8.59 | 10.5 |
| 29 | 5.4 | 12.8 | 5.28 | 14 |
| 30 | 12.5 | 2.7 | 12.8 | 3.1 |
| 31 | 15.2 | 0.5 | 15.6 | 0.7 |

The compositional breakdowns of Samples 32-36 are included in Table 13 herebelow.

TABLE 13

| | Sample No. | | | | |
|---|---|---|---|---|---|
| | 32 | 33 | 34 | 35 | 36 |
| NaOH (g) | 0.00 | 0.10 | 0.20 | 0.40 | 0.80 |
| Ascorbic Acid (g) | 0.00 | 0.22 | 0.44 | 0.88 | 1.76 |
| Tartaric Acid (g) | 2.14 | 2.14 | 2.14 | 2.14 | 2.14 |
| $CuSO_4$ (g) | 0.05 | 0.05 | 0.05 | 0.05 | 0.05 |
| $FeSO_4$ (g) | 0.06 | 0.06 | 0.06 | 0.06 | 0.06 |
| Water (g) | 47.75 | 47.43 | 47.11 | 46.47 | 45.19 |
| Net Solution (g) | 50.00 | 50.00 | 50.00 | 50.00 | 50.00 |
| $Al_2(SO_4)_3$ (g) | 0.5 | 0.5 | 0.5 | 0.5 | 0.5 |
| Total Weight (g) | 50.5 | 50.5 | 50.5 | 50.5 | 50.5 |

Ten (10) grams (g) of each of Samples 32-36 were mixed with ten (10) grams of diatomaceous earth (average particle size 8 microns) and sealed in separate barrier bags containing 2,000 cubic centimeters (cc) of ambient air comprising about 20% oxygen. The change in oxygen and carbon dioxide was monitored as a function of time. The results of Samples 32-36 are included in Table 14 herebelow.

TABLE 14

| | 0 hrs | | 24 hrs | | 48 hrs | | 72 hrs | | 144 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 32 | 20.9 | 0.0 | 20.9 | 0.0 | 20.9 | 0.0 | 20.9 | 0.0 | 20.9 | 0.0 |
| 33 | 20.6 | 0.0 | 20.5 | 0.3 | 20.5 | 0.3 | 20.4 | 0.4 | 20.2 | 0.6 |
| 34 | 20.6 | 0.0 | 20.4 | 0.4 | 20.2 | 0.5 | 20.1 | 0.6 | 19.8 | 0.9 |
| 35 | 20.6 | 0.0 | 20.1 | 0.6 | 19.7 | 0.6 | 19.5 | 0.9 | 19.0 | 1.5 |
| 36 | 20.5 | 0.0 | 19.1 | 1.1 | 18.4 | 1.6 | 17.9 | 2.0 | 16.7 | 3.3 |

| | 168 hrs | | 336 hrs | |
|---|---|---|---|---|
| Sample No. | $O_2$ | $CO_2$ | $O_2$ | $CO_2$ |
| 32 | 20.9 | 0.0 | 20.7 | 0.2 |
| 33 | 20.1 | 0.7 | 19.6 | 1.1 |
| 34 | 19.7 | 1.0 | 19.1 | 1.5 |
| 35 | 18.8 | 1.6 | 17.8 | 2.5 |
| 36 | 16.4 | 3.6 | 14.9 | 5.2 |

The compositional breakdowns of Samples 37-40 are included in Table 15 herebelow.

TABLE 15

| | Sample No. | | | |
|---|---|---|---|---|
| | 37 | 38 | 39 | 40 |
| NaOH (g) | 5.02 | 6.62 | 8.22 | 9.82 |
| Ascorbic Acid (g) | 3.52 | 7.04 | 10.56 | 14.08 |
| Citric Acid (g) | 7.32 | 7.32 | 7.32 | 7.32 |
| $CuSO_4$ (g) | 0.05 | 0.05 | 0.05 | 0.05 |
| $FeSO_4$ (g) | 0.06 | 0.06 | 0.06 | 0.06 |
| Water (g) | 34.03 | 28.91 | 23.79 | 18.67 |
| Net Solution (g) | 50.0 | 50.0 | 50.0 | 50.0 |
| $Al_2(SO_4)_3$ (g) | 0.5 | 0.5 | 0.5 | 0.5 |
| Total Weight (g) | 50.5 | 50.5 | 50.5 | 50.5 |

Fifteen (15) grams (g) of each of Samples 37-40 were mixed with ten (10) grams of diatomaceous earth (average particle size 8 microns) and sealed in separate barrier bags containing 5,000 cubic centimeters (cc) of ambient air comprising about 20% oxygen. The change in oxygen and carbon dioxide was monitored as a function of time. The results of Samples 37-40 are included in Table 16 herebelow.

TABLE 16

| | 0 hrs | | 2 hrs | | 4 hrs | | 6 hrs | | 24 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 37 | 21.3 | 0.0 | 19.7 | 1.0 | 17.8 | 2.6 | 16.5 | 4.0 | 14.6 | 6.3 |
| 38 | 21.3 | 0.0 | 20.0 | 0.5 | 18.8 | 1.4 | 17.8 | 2.0 | 12.6 | 7.0 |

TABLE 16-continued

| | | | | | | | | | | |
|---|---|---|---|---|---|---|---|---|---|---|
| 39 | 21.3 | 0.0 | 20.1 | 0.3 | 19.3 | 0.7 | 18.6 | 0.9 | 11.7 | 5.8 |
| 40 | 21.3 | 0.0 | 19.8 | 0.2 | 19.1 | 0.6 | 18.5 | 0.8 | 14.1 | 3.0 |

| | 48 hrs | | 72 hrs | | 168 hrs | |
|---|---|---|---|---|---|---|
| Sample No. | $O_2$ | $CO_2$ | $O_2$ | $CO_2$ | $O_2$ | $CO_2$ |
| 37 | 13.7 | 7.0 | 13.3 | 7.5 | 12.9 | 7.9 |
| 38 | 11.5 | 8.2 | 10.5 | 9.1 | 9.51 | 10.1 |
| 39 | 9.73 | 8.2 | 8.18 | 9.6 | 7.18 | 11.1 |
| 40 | 9.73 | 6.8 | 8.35 | 8.2 | 6.99 | 10.3 |

The compositional breakdowns of Samples 41-45 are included in Table 17 herebelow.

TABLE 17

| | Sample No. | | | | |
|---|---|---|---|---|---|
| | 41 | 42 | 43 | 44 | 45 |
| NaOH (g) | 2.40 | 2.40 | 2.40 | 2.40 | 2.40 |
| Ascorbic Acid (g) | 5.28 | 5.28 | 5.28 | 5.28 | 5.28 |
| Tartaric Acid (g) | 6.42 | 6.42 | 6.42 | 6.42 | 6.42 |
| $CuSO_4$ (g) | 0.30 | 0.30 | 0.30 | 0.30 | 0.30 |
| $FeSO_4$ (g) | 0.36 | 0.36 | 0.36 | 0.36 | 0.36 |
| Water (g) | 135.24 | 135.24 | 135.24 | 135.24 | 135.24 |
| Net Solution (g) | 150.00 | 150.00 | 150.00 | 150.00 | 150.00 |
| $Al_2(SO_4)_3$ (g) | 1.5 | 1.5 | 1.5 | 1.5 | 1.5 |
| Total Weight (g) | 151.50 | 151.50 | 151.50 | 151.50 | 151.50 |
| Carrier | Activated Carbon (50 × 200 mesh, 5% moisture content) | Activated Carbon (18 × 40 mesh, Acid Washed) | Activated Carbon (50 × 200 mesh, <2% moisture content, 1150 m2/g) | Silica Gel (surface area 520-680 sq.m per g) | Diatomaceous Earth (average particle size 8 microns) |

Fifteen (15) grams (g) of each of Samples 41-45 were mixed with ten (10) grams of the respective carriers set forth above and sealed in separate barrier bags containing 2,000 cubic centimeters (cc) of ambient air comprising about 20% oxygen. The change in oxygen and carbon dioxide was monitored as a function of time at 35° C. The results of Samples 41-45 are included in Table 18 herebelow.

TABLE 18

| | 0 hrs | | 2 hrs | | 4 hrs | | 69 hrs | |
|---|---|---|---|---|---|---|---|---|
| Sample No. | $O_2$ | $CO_2$ | $O_2$ | $CO_2$ | $O_2$ | $CO_2$ | $O_2$ | $CO_2$ |
| 41 | 21.0 | 0.0 | 20.2 | 0.4 | 19.9 | 0.8 | 9.76 | 9.8 |
| 42 | 21.0 | 0.0 | 20.4 | 0.3 | 19.9 | 0.6 | 9.99 | 9.3 |
| 43 | 21.0 | 0.0 | 20.1 | 0.4 | 19.6 | 0.6 | 9.93 | 9.6 |
| 44 | 21.1 | 0.0 | 20.7 | 0.0 | 20.2 | 0.3 | 10.5 | 9.8 |
| 45 | 21.0 | 0.0 | 19.1 | 0.9 | 18.3 | 1.5 | 8.24 | 11.5 |

The compositional breakdowns of Samples 46-49 are included in Table 19 herebelow.

TABLE 19

| | Sample No. | | | |
|---|---|---|---|---|
| | 46 | 47 | 48 | 49 |
| NaOH (g) | 5.02 | 5.02 | 5.02 | 5.02 |
| Ascorbic Acid (g) | 3.52 | 3.52 | 3.52 | 3.52 |
| Tartaric Acid (g) | 8.56 | 8.56 | 8.56 | 8.56 |

TABLE 19-continued

| | Sample No. | | | |
|---|---|---|---|---|
| | 46 | 47 | 48 | 49 |
| CuSO$_4$ (g) | 0.10 | 0.10 | 0.10 | 0.10 |
| FeSO$_4$ (g) | 0.12 | 0.12 | 0.12 | 0.12 |
| Water (g) | 32.68 | 32.68 | 32.68 | 32.68 |
| Net Solution (g) | 50.00 | 50.00 | 50.00 | 50.00 |
| Al$_2$(SO$_4$)$_3$ (g) | 0.50 | 0.50 | 0.50 | 0.50 |
| Total Weight (g) | 50.50 | 50.50 | 50.50 | 50.50 |
| Carrier | Activated Carbon (18 × 40 mesh, Acid Washed) | Activated Carbon (18 × 40 mesh, Acid Washed) & diatomaceous earth (average particle size 8 microns) (50:50 by weight) | Cotton (4 balls/sachet) | Diatomaceous earth (average particle size 8 microns) |

Twelve and a half (12.5) grams (g) of each of Samples 46-49 were mixed with twelve and a half (12.5) grams of the respective carriers set forth above and sealed in separate barrier bags containing 5,000 cubic centimeters (cc) of ambient air comprising about 20% oxygen. The change in oxygen and carbon dioxide was monitored as a function of time at 35° C. The results of Samples 46-49 are included in Table 20 herebelow.

TABLE 20

| | 0 hrs | | 2 hrs | | 4 hrs | | 22 hrs | |
|---|---|---|---|---|---|---|---|---|
| Sample No. | O$_2$ | CO$_2$ | O$_2$ | CO$_2$ | O$_2$ | CO$_2$ | O$_2$ | CO$_2$ |
| 46 | 21.1 | 0.0 | 17.5 | 1.9 | 15.6 | 3.2 | 9.58 | 8.7 |
| 47 | 21.1 | 0.0 | 13.1 | 6.1 | 11.0 | 8.0 | 4.83 | 14.0 |
| 48 | 21.1 | 0.0 | 20.4 | 0.4 | 19.7 | 1.0 | 13.9 | 7.3 |
| 49 | 21.1 | 0.0 | 12.7 | 7.3 | 9.24 | 10.8 | 2.09 | 19.1 |

The compositional breakdowns of Samples 50-51 are included in Table 21 herebelow.

TABLE 21

| | Sample No. | |
|---|---|---|
| | 50 | 51 |
| NaOH (g) | 6.62 | 6.62 |
| Ascorbic Acid (g) | 7.04 | 7.04 |
| Tartaric Acid (g) | 8.56 | 8.56 |
| CuSO$_4$ (g) | 0.20 | 0.20 |
| FeSO$_4$ (g) | 0.24 | 0.24 |
| Water (g) | 36.74 | 36.74 |
| Net Solution (g) | 59.40 | 59.40 |
| Al$_2$(SO$_4$)$_3$ (g) | 1.2 | 1.2 |
| Total Weight (g) | 60.60 | 60.60 |
| Carrier | Activated Carbon (18 × 40 mesh, Acid Washed) & diatomaceous earth (average particle size 8 microns) (50:50 by weight) | Activated Carbon (18 × 40 mesh, Acid Washed) & diatomaceous earth (average particle size 8 microns) (50:50 by weight) |

Twelve and a half (12.5) grams (g) of each of Samples 50-51 were mixed with twelve and a half (12.5) grams of the respective carriers set forth above and sealed in separate barrier bags containing 5,000 cubic centimeters (cc) of ambient air comprising about 20% oxygen. Sample No. 50 was added over the carrier which was prefilled into a Tyvek® sachet. The resulting composition was then shaken. Sample No. 51 was mixed with a spoon into the carrier and the resulting composition was tested as is in a glass container without to using a sachet. The change in oxygen and carbon dioxide was monitored as a function of time at 35° C. The results of Samples 50-51 are included in Table 22 herebelow.

TABLE 22

| | 0 hrs | | 2 hrs | | 4 hrs | | 22 hrs | | 22 hrs | |
|---|---|---|---|---|---|---|---|---|---|---|
| Sample No. | O$_2$ | CO$_2$ | O$_2$ | CO$_2$ | O$_2$ | CO$_2$ | O$_2$ | CO$_2$ | O$_2$ | CO$_2$ |
| 50 | 21.1 | 0.0 | 11.0 | 6.8 | 8.54 | 8.8 | 7.74 | 9.4 | 0.0 | 19.8 |
| 51 | 21.1 | 0.0 | 11.2 | 8.5 | 9.48 | 9.9 | 8.97 | 10.3 | 0.0 | 20.5 |

The compositional breakdowns of Samples 52-54 are included in Table 23 herebelow.

TABLE 23

| | Sample No. | | |
|---|---|---|---|
| | 52 | 53 | 54 |
| NaOH (g) | 6.62 | 8.22 | 9.82 |
| Ascorbic Acid (g) | 7.04 | 7.04 | 7.04 |
| Tartaric Acid (g) | 8.56 | 8.56 | 8.56 |
| $CuSO_4$ (g) | 0.20 | 0.20 | 0.20 |
| $FeSO_4$ (g) | 0.24 | 0.24 | 0.24 |
| Water (g) | 37.34 | 35.74 | 34.14 |
| Net Solution (g) | 60.00 | 60.00 | 60.00 |
| $Al_2(SO_4)_3$ (g) | 1.2 | 1.2 | 1.2 |
| EDTA (g) | 0.8 | 0.8 | 0.8 |
| Total Weight (g) | 62.00 | 62.00 | 62.00 |
| pH | 5.755 | 11.434 | 12.979 |
| Carrier | Activated Carbon (18 × 40 mesh, Acid Washed) & diatomaceous earth (average particle size 8 microns) (50:50 by weight) | Activated Carbon (18 × 40 mesh, Acid Washed) & diatomaceous earth (average particle size 8 microns) (50:50 by weight) | Activated Carbon (18 × 40 mesh, Acid Washed) & diatomaceous earth (average particle size 8 microns) (50:50 by weight) |

Ten (10) grams (g) of each of Samples 52-54 were mixed with ten (10) grams of the respective carriers set forth above and sealed in separate barrier bags containing 2,000 cubic centimeters (cc) of ambient air comprising about 20% oxygen. For each of Sample Nos. 52-54, the respective sample was added over the carrier which was prefilled into a Tyvek® sachet. The resulting compositions were then shaken. The change in oxygen and carbon dioxide was monitored as a function of time at 35° C. The results of Samples 52-54 are included in Table 24 herebelow.

TABLE 24

| | 0 hrs | | 1 hrs | | 2 hrs | | 3 hrs | | 23 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 52 | 21.1 | 0.0 | 10.4 | 8.3 | 7.92 | 10.3 | 6.56 | 11.5 | 0.567 | 18.0 |
| 53 | 21.1 | 0.0 | 11.2 | 5.6 | 9.72 | 6.8 | 8.93 | 7.5 | 5.60 | 10.8 |
| 54 | 21.1 | 0.0 | 12.4 | 2.2 | 11.9 | 2.5 | 11.6 | 2.8 | 10.4 | 3.7 |

The data above with respect to Sample Nos. 52-54 in part shows the difference in composition performance based on pH value. In relative terms, Sample No. 54 had the highest pH, Sample No. 53 had a pH value between that of Sample Nos. 52 and 54, while Sample No. 54 had the lowest pH. As can be seen from Table 24, the lower the pH, the fast acting the composition behaves, i.e., Sample No. 52 absorbing oxygen and emits carbon dioxide more rapidly than Sample No. 54.

The compositional breakdowns of Samples 55-56 are included in Table 25 herebelow.

TABLE 25

| | Sample No. | |
|---|---|---|
| | 55 | 56 |
| NaOH (g) | 8.22 | 4.80 |
| Ascorbic Acid (g) | 10.56 | 10.56 |
| Tartaric Acid (g) | 8.56 | 0.00 |
| $CuSO_4$ (g) | 0.20 | 0.20 |
| $FeSO_4$ (g) | 0.24 | 0.24 |
| Water (g) | 42.22 | 54.20 |
| Net Solution (g) | 70.00 | 70.00 |
| $Al_2(SO_4)_3$ (g) | 1.2 | 1.2 |
| EDTA (g) | 0.8 | 0.8 |
| Total Weight (g) | 72.00 | 72.00 |
| Carrier | Activated Carbon (18 × 40 mesh, Acid Washed) & diatomaceous earth (average particle size 8 microns) (50:50 by weight) | Activated Carbon (18 × 40 mesh, Acid Washed) & diatomaceous earth (average particle size 8 microns) (50:50 by weight) |

Ten (10) grams (g) of each of Samples 55-56 were mixed with ten (10) grams of the respective carriers set forth above and sealed in separate barrier bags containing 2,000 cubic centimeters (cc) of ambient air comprising about 20% oxygen. For each of Sample Nos. 55-56, the respective sample was added over the carrier which was prefilled into a Tyvek® sachet. The resulting compositions were then shaken. The change in oxygen and carbon dioxide was monitored as a function of time at 35° C. The results of Samples 55-56 to are included in Table 26 herebelow.

TABLE 26

| Sample No. | 0 hrs | | 2 hrs | | 4 hrs | | 20 hrs | |
| --- | --- | --- | --- | --- | --- | --- | --- | --- |
| | $O_2$ | $CO_2$ | $O_2$ | $CO_2$ | $O_2$ | $CO_2$ | $O_2$ | $CO_2$ |
| 55 | 21.1 | 0.0 | 8.03 | 9.1 | 5.54 | 11.4 | 0.0 | 18.8 |
| 56 | 21.1 | 0.0 | 8.14 | 7.7 | 6.47 | 9.2 | 0.255 | 15.4 |

The compositional breakdowns of Samples 57-61 are included in Table 27 herebelow.

TABLE 27

| | Sample No. | | | | |
| --- | --- | --- | --- | --- | --- |
| | 57 | 58 | 59 | 60 | 61 |
| NaOH (g) | 1.60 | 1.60 | 1.60 | 1.60 | 1.60 |
| Ascorbic Acid (g) | 3.52 | 3.52 | 3.52 | 3.52 | 3.52 |
| Tartaric Acid (g) | 2.14 | | | | |
| Acetic Acid (g) | | 1.71 | | | |
| Lactic Acid (g) | | | 2.57 | | |
| Malic Acid (g) | | | | 1.91 | |
| Citric Acid (g) | | | | | 1.83 |
| $CuSO_4$ (g) | 0.05 | 0.05 | 0.05 | 0.05 | 0.05 |
| $FeSO_4$ (g) | 0.06 | 0.06 | 0.06 | 0.06 | 0.06 |
| Water (g) | 32.63 | 33.06 | 32.20 | 32.86 | 32.94 |
| Net Solution (g) | 40.00 | 40.00 | 40.00 | 40.00 | 40.00 |
| $Al_2(SO_4)_3$ (g) | 0.5 | 0.5 | 0.5 | 0.5 | 0.5 |
| $Na_2EDTA$ (g) | 0.5 | 0.5 | 0.5 | 0.5 | 0.5 |
| Total Weight (g) | 41.00 | 41.00 | 41.00 | 41.00 | 41.00 |

Ten (10) grams (g) of each of Samples 57-61 were mixed with ten (10) grams of diatomaceous earth (average particle size 8 microns) and sealed in separate barrier bags containing 1,500 cubic centimeters (cc) of ambient air comprising about 20% oxygen. The change in oxygen and carbon dioxide was monitored as a function of time at room temperature. The results of Samples 57-61 are included in Table 28 herebelow.

TABLE 28

| | 0 hrs | | 24 hrs | | 43 hrs | | 48 hrs | | 73 hrs | |
| --- | --- | --- | --- | --- | --- | --- | --- | --- | --- | --- |
| Sample No. | $O_2$ | $CO_2$ | $O_2$ | $CO_2$ | $O_2$ | $CO_2$ | $O_2$ | $CO_2$ | $O_2$ | $CO_2$ |
| 57 | 21.5 | 0.0 | 11.8 | 5.3 | 9.13 | 8.2 | 8.29 | 8.9 | 5.24 | 11.7 |
| 58 | 21.5 | 0.0 | 9.13 | 6.9 | 6.51 | 9.7 | 5.82 | 10.4 | 3.42 | 12.6 |
| 59 | 21.5 | 0.0 | 12.2 | 4.0 | 10.2 | 6.0 | 9.58 | 6.5 | 7.10 | 8.50 |
| 60 | 21.5 | 0.0 | 10.5 | 6.8 | 8.22 | 9.3 | 7.58 | 9.9 | 5.20 | 12.3 |
| 61 | 21.5 | 0.0 | 10.3 | 6.6 | 8.10 | 9.3 | 7.47 | 9.9 | 5.22 | 12.2 |

| | 96 hrs | | 168 hrs | | 192 hrs | | 380 hrs | |
| --- | --- | --- | --- | --- | --- | --- | --- | --- |
| Sample No. | $O_2$ | $CO_2$ | $O_2$ | $CO_2$ | $O_2$ | $CO_2$ | $O_2$ | $CO_2$ |
| 57 | 3.42 | 13.7 | 0.255 | 17.9 | 0.000 | 18.7 | 0.000 | 21.0 |
| 58 | 2.17 | 14.1 | 0.242 | 16.8 | 0.011 | 17.4 | 0.000 | 18.3 |
| 59 | 5.37 | 9.90 | 2.44 | 13.6 | 1.76 | 14.4 | 0.00 | 17.2 |
| 60 | 3.88 | 13.9 | 1.53 | 17.1 | 1.05 | 17.8 | 0.00 | 20.0 |
| 61 | 4.00 | 13.6 | 2.01 | 16.6 | 1.63 | 17.2 | 0.023 | 19.3 |

The compositional breakdowns of Samples 62-66 are included in Table 29 herebelow.

TABLE 29

| | Sample No. | | | | |
|---|---|---|---|---|---|
| | 62 | 63 | 64 | 65 | 66 |
| NaOH (g) | 1.60 | 1.60 | 1.60 | 1.60 | 1.60 |
| Ascorbic Acid (g) | 3.52 | 3.52 | 3.52 | 3.52 | 3.52 |
| Potassium sodium tartrate ($KNaC_4H_4O_6$) (g) | 3.00 | | | | |
| Sodium acetate ($C_2H_3NaO_2 \cdot 3H_2O$) (g) | | 3.88 | | | |
| Sodium lactate (60% aq. sol.) ($C_3H_5NaO_3$) (g) | | | 5.33 (3.20 g of salt) | | |
| Sodium malate ($C_4H_4Na_2O_5$) (g) | | | | 2.54 | |
| trisodium citrate ($Na_3C_6H_5O_7$) (g) | | | | | 2.80 |
| $CuSO_4$ (g) | 0.05 | 0.05 | 0.05 | 0.05 | 0.05 |
| $FeSO_4$ (g) | 0.06 | 0.06 | 0.06 | 0.06 | 0.06 |
| Water (g) | 31.77 | 30.89 | 29.44 | 32.23 | 31.97 |
| Net Solution (g) | 40.00 | 40.00 | 40.00 | 40.00 | 40.00 |
| $Al_2(SO_4)_3$ (g) | 0.5 | 0.5 | 0.5 | 0.5 | 0.5 |
| $Na_2EDTA$ (g) | 0.5 | 0.5 | 0.5 | 0.5 | 0.5 |
| Total Weight (g) | 41.00 | 41.00 | 41.00 | 41.00 | 41.00 |

Ten (10) grams (g) of each of Samples 62-66 were mixed with ten (10) grams of diatomaceous earth (average particle size 8 microns) and sealed in separate barrier bags containing 1,500 cubic centimeters (cc) of ambient air comprising about 20% oxygen. The change in oxygen and carbon dioxide was monitored as a function of time at room temperature. The results of Samples 62-66 are included in Table 30 herebelow.

TABLE 30

| | 0 hrs | | 24 hrs | | 43 hrs | | 48 hrs | | 73 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 62 | 21.5 | 0.0 | 9.58 | 6.3 | 8.61 | 7.4 | 8.27 | 7.6 | 7.00 | 8.6 |
| 63 | 21.5 | 0.0 | 7.88 | 7.6 | 6.72 | 8.8 | 6.38 | 9.1 | 5.03 | 10.0 |
| 64 | 21.5 | 0.0 | 9.12 | 6.2 | 8.21 | 7.2 | 7.87 | 7.4 | 6.64 | 8.2 |
| 65 | 21.5 | 0.0 | 8.55 | 7.6 | 7.58 | 8.7 | 7.25 | 8.9 | 6.17 | 9.9 |
| 66 | 21.5 | 0.0 | 7.37 | 8.5 | 6.42 | 9.7 | 6.10 | 9.9 | 5.12 | 10.7 |

| | 96 hrs | | 168 hrs | | 192 hrs | | 380 hrs | |
|---|---|---|---|---|---|---|---|---|
| Sample No. | $O_2$ | $CO_2$ | $O_2$ | $CO_2$ | $O_2$ | $CO_2$ | $O_2$ | $CO_2$ |
| 62 | 6.14 | 9.3 | 4.76 | 11.0 | 4.45 | 11.4 | 2.70 | 13.1 |
| 63 | 4.31 | 10.8 | 3.27 | 11.8 | 3.11 | 12.1 | 2.05 | 12.9 |
| 64 | 6.02 | 8.8 | 5.16 | 9.8 | 5.03 | 10.1 | 5.26 | 10.5 |
| 65 | 5.62 | 10.4 | 4.71 | 11.4 | 4.57 | 11.6 | 3.59 | 12.5 |
| 66 | 4.68 | 11.2 | 3.94 | 12.0 | 3.83 | 12.2 | 2.98 | 12.9 |

The compositional breakdowns of Samples 67-70 are included in Table 31 herebelow.

TABLE 31

| | Sample No. | | | |
|---|---|---|---|---|
| | 67 | 68 | 69 | 70 |
| NaOH (g) | 4.80 | 4.80 | 4.80 | 4.80 |
| Tannic Acid (g) | 8.16 | | | 2.72 |

TABLE 31-continued

| | Sample No. | | | |
|---|---|---|---|---|
| | 67 | 68 | 69 | 70 |
| Catechol (g) | | 6.60 | | 2.20 |
| Ascorbic acid (g) | | | 10.56 | 3.52 |
| Tartaric acid (g) | 6.42 | 6.42 | 6.42 | 6.42 |
| $CuSO_4$ (g) | 0.15 | 0.15 | 0.15 | 0.15 |
| $FeSO_4$ (g) | 0.75 | 0.75 | 0.75 | 0.75 |

TABLE 31-continued

| | Sample No. | | | |
|---|---|---|---|---|
| | 67 | 68 | 69 | 70 |
| Water (g) | 29.72 | 31.28 | 27.32 | 29.44 |
| Net Solution (g) | 50.00 | 50.00 | 50.00 | 50.00 |
| $Al_2(SO_4)_3$ (g) | 0.5 | 0.5 | 0.5 | 0.5 |
| $Na_2EDTA$ (g) | 0.5 | 0.5 | 0.5 | 0.5 |
| Total Weight (g) | 51.00 | 51.00 | 51.00 | 51.00 |

Ten (10) grams (g) of each of Samples 67-70 were mixed with twelve and a half (12.5) grams of a 60:40 blend of Activated Carbon (18×40 mesh, Acid Washed) and diatomaceous earth (average particle size 8 microns) and sealed in separate barrier bags containing 2,000 cubic centimeters (cc) of ambient air comprising about 20% oxygen. The change in oxygen and carbon dioxide was monitored as a function of time at room temperature. The results of Samples 67-70 are included in Table 32 herebelow.

TABLE 32

| | 0 hrs | | 26 hrs | | 96 hrs | | 264 hrs | | 288 hrs | |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $O_2$ | $CO_2$ |
| 67 | 21.5 | 0.0 | 18.9 | 0.3 | 17.5 | 1.7 | 15.2 | 3.2 | 14.7 | 3.4 |
| 68 | 21.5 | 0.0 | 14.8 | 0.1 | 11.4 | 1.0 | 7.63 | 2.3 | 7.21 | 2.4 |
| 69 | 21.5 | 0.0 | 1.03 | 14.4 | 0.00 | 19.9 | 0.00 | 21.3 | 0.00 | 21.5 |
| 70 | 21.5 | 0.0 | 8.65 | 7.3 | 4.21 | 11.4 | 0.861 | 14.5 | 0.597 | 14.8 |

| | 432 hrs | | 528 hrs | |
|---|---|---|---|---|
| Sample No. | $O_2$ | $CO_2$ | $O_2$ | $CO_2$ |
| 67 | 13.8 | 4.2 | 13.1 | 4.5 |
| 68 | 5.46 | 3.0 | 4.58 | 3.7 |
| 69 | 0.00 | 21.7 | 0.00 | 21.8 |
| 70 | 0.00 | 15.9 | 0.00 | 15.9 |

The compositional breakdowns of Samples 71-77 are included in Table 33 herebelow.

TABLE 33

| | Sample No. | | | | | | |
|---|---|---|---|---|---|---|---|
| | 71 | 72 | 73 | 74 | 75 | 76 | 77 |
| Ascorbic acid (g) | 14.26 | 14.26 | 14.26 | 14.26 | 14.26 | 14.26 | 14.26 |
| Tartaric acid (g) | 11.56 | 11.56 | 11.56 | 11.56 | 11.56 | 11.56 | 11.56 |
| $CuSO_4$ (g) | 0.27 | 0.27 | 0.27 | 0.27 | 0.27 | 0.27 | 0.27 |
| $FeSO_4$ (g) | 1.35 | 1.35 | 1.35 | 1.35 | 1.35 | 1.35 | 1.35 |
| Water (g) | 82.56 | 82.56 | 82.56 | 82.56 | 82.56 | 82.56 | 82.56 |
| Net Solution (g) | 110.0 | 110.0 | 110.0 | 110.0 | 110.0 | 110.0 | 110.0 |
| $Al_2(SO_4)_3$ (g) | 2.4 | 2.4 | 2.4 | 2.4 | 2.4 | 2.4 | 2.4 |
| EDTA (g) | 1.6 | 1.6 | 1.6 | 1.6 | 1.6 | 1.6 | 1.6 |
| Total Weight (g) | 114.0 | 114.0 | 114.0 | 114.0 | 114.0 | 114.0 | 114.0 |

50 wt % NaOH was prepared by dissolving 40 g of NaOH into 40 g of water. 50 g of each of Sample Nos. 71-77 were combined with a portion of 50 wt % NaOH and water as set forth in Table 34 herebelow.

TABLE 34

|  | Sample No. | | | | | | |
| --- | --- | --- | --- | --- | --- | --- | --- |
|  | 71 | 72 | 73 | 74 | 75 | 76 | 77 |
| 50 wt % aqueous NaOH (g) | 0.0 | 3.2 | 8.9 | 9.6 | 9.9 | 11.9 | 23.7 |
| Water (g) | 20.0 | 16.8 | 11.1 | 10.4 | 10.1 | 8.1 | 0.0 |
| Net Solution (g) | 70.0 | 70.0 | 70.0 | 70.0 | 70.0 | 70.0 | 73.7 |
| pH | 1.420 | 2.943 | 5.062 | 7.187 | 9.607 | 11.171 | 12.663 |

Each of the above samples were then combined with a mixture of Solid-a-Sorb and Activated Carbon (18×40 mesh, Acid Washed) by a drop-seal method. Solid-a-Sorb is a kiln dried and milled natural diatomaceous earth (CAS #61790-53-2) sold by EP Minerals® of Reno, Nev. The ratio of Solid-a-Sorb to Activated Carbon (18×40 mesh, Acid Washed) was 60:40, while the ratio of each sample to the foregoing support was 9:11. Twenty (20) grams (g) of each of Samples 71-77 in combination with the carrier was sealed in separate barrier bags containing 2,000 cubic centimeters (cc) of ambient air comprising about 20% oxygen. The change in oxygen and carbon dioxide was monitored as a function of time at 35° C. The results of Samples 71-77 are included in Table 35 herebelow.

TABLE 35

|  | 0 hrs | | 3 hrs | | 23 hrs | | 95 hrs | | 118 hrs | |
| --- | --- | --- | --- | --- | --- | --- | --- | --- | --- | --- |
| Sample No. | $O_2$ | $CO_2$ | $O_2$ | $CO_2$ | $O_2$ | $CO_2$ | $O_2$ | $CO_2$ | $O_2$ | $CO_2$ |
| 71 | 21.5 | 0.0 | 18.0 | 0.6 | 14.6 | 3.1 | 9.89 | 7.5 | 9.03 | 8.5 |
| 72 | 21.5 | 0.0 | 17.1 | 1.5 | 11.8 | 5.7 | 6.65 | 10.9 | 5.61 | 12.2 |
| 73 | 21.5 | 0.0 | 13.7 | 4.2 | 9.23 | 7.7 | 4.69 | 13.3 | 3.94 | 14.4 |
| 74 | 21.5 | 0.0 | 14.5 | 3.7 | 9.72 | 7.3 | 5.13 | 12.6 | 4.39 | 13.9 |
| 75 | 21.5 | 0.0 | 14.8 | 3.5 | 10.0 | 6.5 | 5.33 | 12.4 | 4.52 | 13.7 |
| 76 | 21.5 | 0.0 | 14.8 | 3.4 | 10.8 | 6.1 | 8.04 | 9.3 | 7.26 | 10.2 |
| 77 | 21.5 | 0.0 | 16.2 | 0.0 | 15.2 | 0.0 | 13.5 | 0.0 | 13.0 | 0.1 |

The foregoing samples show that Sample No. 73, having a pH of 5.062, absorbed the greatest quantity of oxygen, while also emitting the greatest quantity of carbon dioxide.

The compositional breakdowns of Samples 78-86 are included in Table 36 herebelow.

TABLE 36

|  | Sample No. | | | | | | | | |
| --- | --- | --- | --- | --- | --- | --- | --- | --- | --- |
|  | 78 | 79 | 80 | 81 | 82 | 83 | 84 | 85 | 86 |
| Ascorbic acid (g) | 14.26 | 14.26 | 14.26 | 14.26 | 14.26 | 14.26 | 14.26 | 14.26 | 14.26 |
| Tartaric acid (g) | 11.56 | 11.56 | 11.56 | 11.56 | 11.56 | 11.56 | 11.56 | 11.56 | 11.56 |
| $CuSO_4$ (g) | 0.27 | 0.27 | 0.27 | 0.27 | 0.27 | 0.27 | 0.27 | 0.27 | 0.27 |
| $FeSO_4$ (g) | 1.35 | 1.35 | 1.35 | 1.35 | 1.35 | 1.35 | 1.35 | 1.35 | 1.35 |
| Water (g) | 82.56 | 82.56 | 82.56 | 82.56 | 82.56 | 82.56 | 82.56 | 82.56 | 82.56 |
| Net Solution (g) | 110.0 | 110.0 | 110.0 | 110.0 | 110.0 | 110.0 | 110.0 | 110.0 | 110.0 |
| $Al_2(SO_4)_3$ (g) | 2.4 | 2.4 | 2.4 | 2.4 | 2.4 | 2.4 | 2.4 | 2.4 | 2.4 |
| EDTA (g) | 1.6 | 1.6 | 1.6 | 1.6 | 1.6 | 1.6 | 1.6 | 1.6 | 1.6 |
| Total Weight (g) | 114.0 | 114.0 | 114.0 | 114.0 | 114.0 | 114.0 | 114.0 | 114.0 | 114.0 |

100 g of each of Samples 78-86 were combined with 40 g of water, yielding a final net solution weight of 140 g and having a pH of 1.416.

Each of the above samples, after combination with the additional water, were then combined with a mixture of Solid-a-Sorb and Activated Carbon (18×40 mesh, Acid Washed) by a drop-seal method. The ratio of Solid-a-Sorb to Activated Carbon (18×40 mesh, Acid Washed) was 60:40, while the ratio of each sample to the foregoing support was 9:11. Twenty (20) grams (g) of each of Samples 78-86 in combination with the carrier was sealed in separate barrier bags containing 2,000 cubic centimeters (cc) of ambient air comprising about 20% oxygen. The change in oxygen and carbon dioxide was monitored as a function of time at refrigerated temperatures (1-4° C.) (Sample Nos. 78-80), at room temperatures (22.1-22.7° C.) (Sample Nos. 81-83), and at an elevated temperature (35° C.) (Sample Nos. 84-86). The results of Samples 78-86 are included in Table 37 herebelow.

TABLE 37

| Sample No. | 0 hrs | | 7 hrs | | 24.5 hrs | | 96 hrs | |
| --- | --- | --- | --- | --- | --- | --- | --- | --- |
| | $O_2$ | $CO_2$ | $O_2$ | $CO_2$ | $O_2$ | $CO_2$ | $O_2$ | $CO_2$ |
| 78 | 21.5 | 0.0 | 19.8 | 0.0 | 18.1 | 0.3 | 17.5 | 0.6 |
| 79 | 21.5 | 0.0 | 19.8 | 0.0 | 18.0 | 0.3 | 17.4 | 0.6 |
| 80 | 21.5 | 0.0 | 19.8 | 0.0 | 18.0 | 0.3 | 17.4 | 0.5 |
| 81 | 21.5 | 0.0 | 18.1 | 0.7 | 17.0 | 1.0 | 14.8 | 2.5 |
| 82 | 21.5 | 0.0 | 18.1 | 0.4 | 17.0 | 1.0 | 14.8 | 2.4 |
| 83 | 21.5 | 0.0 | 18.0 | 0.5 | 17.0 | 1.0 | 14.7 | 2.4 |
| 84 | 21.5 | 0.0 | 17.2 | 1.1 | 14.3 | 3.4 | 9.24 | 7.9 |
| 85 | 21.5 | 0.0 | 17.4 | 1.0 | 14.5 | 3.2 | 9.91 | 7.4 |
| 86 | 21.5 | 0.0 | 17.4 | 1.0 | 14.4 | 3.3 | 9.55 | 7.6 |

The compositional breakdowns of Samples 87-96 are included in Table 38 herebelow.

TABLE 38

| | Sample No. | | | | | | | | | |
| --- | --- | --- | --- | --- | --- | --- | --- | --- | --- | --- |
| | 87 | 88 | 89 | 90 | 91 | 92 | 93 | 94 | 95 | 96 |
| Ascorbic acid (g) | 14.26 | 14.26 | 14.26 | 14.26 | 14.26 | 14.26 | 14.26 | 14.26 | 14.26 | 14.26 |
| Tartaric acid (g) | 11.56 | 11.56 | 11.56 | 11.56 | 11.56 | 11.56 | 11.56 | 11.56 | 11.56 | 11.56 |
| $CuSO_4$ (g) | 0.27 | 0.27 | 0.27 | 0.27 | 0.27 | 0.27 | 0.27 | 0.27 | 0.27 | 0.27 |
| $FeSO_4$ (g) | 1.35 | 1.35 | 1.35 | 1.35 | 1.35 | 1.35 | 1.35 | 1.35 | 1.35 | 1.35 |
| Water (g) | 82.56 | 82.56 | 82.56 | 82.56 | 82.56 | 82.56 | 82.56 | 82.56 | 82.56 | 82.56 |
| Net Solution (g) | 110.0 | 110.0 | 110.0 | 110.0 | 110.0 | 110.0 | 110.0 | 110.0 | 110.0 | 110.0 |
| $Al_2(SO_4)_3$ (g) | 2.4 | 2.4 | 2.4 | 2.4 | 2.4 | 2.4 | 2.4 | 2.4 | 2.4 | 2.4 |
| EDTA (g) | 1.6 | 1.6 | 1.6 | 1.6 | 1.6 | 1.6 | 1.6 | 1.6 | 1.6 | 1.6 |
| Total Weight (g) | 114.0 | 114.0 | 114.0 | 114.0 | 114.0 | 114.0 | 114.0 | 114.0 | 114.0 | 114.0 |

100 g of each of Samples 87-96 were combined with 40 g of water, yielding a final net solution weight of 140 g.

Each of the above samples, after combination with the additional water, were then combined with a carrier (refered to as support in table 39 herebelow) by a drop-seal method at a ratio of the sample to support of 9:11. The water activity of each of the resulting materials was measured at the temperature indicated below. The results of water activity measurements of Samples 87-96 are included in Table 39 herebelow.

TABLE 39

| | Sample No. | | | | |
| --- | --- | --- | --- | --- | --- |
| | 87 | 88 | 89 | 90 | 91 | 92 |
| Support type | Silica Gel (Silica Gel, Granular, 50 × 200 mesh) | Silica Gel (surface area 520-680 sq. m per g) | Activated carbon (50 × 200 mesh) | Activated Carbon (18 × 40 mesh, Acid Washed) | Diatomanceous earth (average particle size 8 microns) |
| Water activity of support | 0.053 | 0.347 | 0.371 | 0.330 | 0.797 |

TABLE 39-continued

| | | | | | | |
|---|---|---|---|---|---|---|
| Temperature of above measurement | | 25.8° C. | 25.6° C. | 25.4° C. | 25.5° C. | 25.6° C. |
| Water activity of sample with support | 0.871 | 0.984 | 0.991 | 0.918 | 0.900 | 0.976 |
| Temperature of above measurement | 22.9° C. | 25.4° C. | 25.3° C. | 26.4° C. | 26.0° C. | 25.4° C. |

| | Sample No. | | | |
|---|---|---|---|---|
| | 93 | 94 | 95 | 96 |
| Support type | Solid-a-Sorb | Solid-a-Sorb:Activated carbon (18 × 40 mesh, Acid Washed)(60:40) | Chabazite (<50 mesh) | Powdered cellulose (Solka Floc 900 FCC, Solvaira Specialties) |
| Water activity of support | 0.428 | 0.370 | 0.594 | 0.442 |
| Temperature of above measurement | 25.5° C. | 25.4° C. | 25.1° C. | 25.5° C. |
| Water activity of sample with support | 0.954 | 0.874 | 1.004 | 0.964 |
| Temperature of above measurement | 25.4° C. | 25.5° C. | 24.4° C. | 25.4° C. |

It has been found that the present composition may also use solvents other than water, or other solvent in combination with water. Polar, protic solvents may be used alone or in combination with water. For example, ethanol may be combined with water thereby lowering the solvent's freezing point while maintaining the oxygen absorption and carbon dioxide emission described herein.

The compositional breakdowns of Samples 97-102 are included in Table 40 herebelow.

TABLE 40

| | Sample No. | | | | | |
|---|---|---|---|---|---|---|
| | 97 | 98 | 99 | 100 | 101 | 102 |
| Ascorbic acid (g) | 6.6 | 6.6 | 6.6 | 6.6 | 6.6 | 6.6 |
| Tartaric acid (g) | 5.35 | 5.35 | 5.35 | 5.35 | 5.35 | 5.35 |
| $CuSO_4$ (g) | 0.27 | 0.27 | 0.27 | 0.27 | 0.27 | 0.27 |
| $FeSO_4$ (g) | 1.35 | 1.35 | 1.35 | 1.35 | 1.35 | 1.35 |
| Propylene glycol (g) | 60.48 | 60.48 | 60.48 | 60.48 | 60.48 | 60.48 |
| $Al_2(SO_4)_3$ (g) | 2.4 | 2.4 | 2.4 | 2.4 | 2.4 | 2.4 |
| EDTA (g) | 1.6 | 1.6 | 1.6 | 1.6 | 1.6 | 1.6 |
| Net Solution (g) | 78.05 | 78.05 | 78.05 | 78.05 | 78.05 | 78.05 |

Samples 97-102 each had a water activity of $a_w$=0.055 at 24.5° C. 5 g of each of Samples 97-102 were combined with the various supports identified below. 4 grams of each of Samples 97 and 98, and 5 grams of each of Samples 99-102 were then placed inside separate 2,000 cubic centimeter barrier bag containing ambient air, i.e., approximately 20% oxygen, at room temperature. Additionally, several of Samples 97-102 included a 2 gram source of moisture, i.e., blotter paper containing 2 grams of water, within the barrier bag.

TABLE 41

| | Sample No. | | | | | |
|---|---|---|---|---|---|---|
| | 97 | 98 | 99 | 100 | 101 | 102 |
| Support type | Powdered cellulose | Powdered cellulose | Carboxymethyl cellulose | Carboxymethyl cellulose | Diatomaceous earth | Diatomaceous earth |
| Amount of respective Sample (g) | 5.0 | 5.0 | 5.0 | 5.0 | 5.0 | 5.0 |

TABLE 41-continued

| | Sample No. | | | | | |
|---|---|---|---|---|---|---|
| | 97 | 98 | 99 | 100 | 101 | 102 |
| Amount of support (g) | 5.0 | 5.0 | 10.0 | 10.0 | 10.0 | 10.0 |
| Total weight (g) | 10.0 | 10.0 | 15.0 | 15.0 | 15.0 | 15.0 |
| Moisture source included | No | Yes | No | Yes | No | Yes |

The water activity of each sample was measured after the oxygen absorption and carbon dioxide emission testing was completed. The results of the testing of Samples 97-102 are included in Table 42 herebelow. Oxygen absorption and carbon dioxide emission performance of Samples 97-102 was found to vary based on whether a moisture source was present during the test. The presence of a moisture source favored more oxygen absorption compared to when it was absent for the same sample. In addition, the chemical makeup of the carrier used in Samples 97-102 had an effect on the quantity of carbon dioxide emitted by these samples, prepared using a polar, protic solvent in lieu of water. It is believed that the absence of water and the presence of a polar, protic solvent in Samples 97-102 may have resulted in one or more predominant alternate chemical pathway(s), by which the cyclical nature of reaction proposed in FIG. 1 continues to operate. It is believed that the absence of water and the presence of a polar protic solvent in Samples 97-102 favored the formation of carbonate esters as opposed to the release of carbon dioxide that was observed in the majority of prior Samples 1-96 that were tested for carbon dioxide emission.

TABLE 42

| | 0 hrs | | 17 hrs | | 96 hrs | | 115 hrs | | Water activity after 115 hrs | Temperature of water activity measurement |
|---|---|---|---|---|---|---|---|---|---|---|
| Sample No. | $O_2$ | $CO_2$ | $O_2$ | $CO_2$ | $O_2$ | $CO_2$ | $O_2$ | $CO_2$ | $a_w$ | °C. |
| 97 | 21.5 | 0.0 | 20.8 | 0.0 | 19.9 | 0.0 | 19.7 | 0.0 | 0.320 | 25.1 |
| 98 | 21.5 | 0.0 | 19.1 | 0.0 | 18.1 | 0.0 | 17.9 | 0.0 | 0.818 | 24.7 |
| 99 | 21.5 | 0.0 | 18.6 | 0.0 | 16.4 | 0.2 | 16.0 | 0.2 | 0.347 | 25.1 |
| 100 | 21.5 | 0.0 | 18.1 | 0.0 | 15.4 | 0.9 | 14.9 | 1.0 | 0.703 | 24.5 |
| 101 | 21.5 | 0.0 | 20.3 | 0.0 | 19.5 | 0.0 | 19.3 | 0.0 | 0.375 | 25.0 |
| 102 | 21.5 | 0.0 | 19.1 | 0.0 | 17.6 | 0.0 | 17.3 | 0.0 | 0.826 | 24.6 |

Based on the results discussed above, the ranges set forth in Table 43 of the various components of some embodiments of the present composition have been found to provide acceptable oxygen absorption and carbon dioxide emission. It should be appreciated that other components as well as compositions falling outside of the ranges below are also suitable for use in the present composition.

TABLE 43

| Component | Range (wt %) |
|---|---|
| NaOH | 3.2-15 |
| Ascorbic acid | 0.0-19.27 |
| Tartaric acid | 4.2-17 |
| $CuSO_4$ | 0.0-0.37 |
| $FeSO_4$ | 0.0-1.82 |
| Water | 46.54-92.6 |

It should be appreciated that the foregoing composition provides a variety of benefits over known compositions. The following is a non-limiting list of some of the various benefits. Due to the diminished amount, e.g., none or nearly none, of bicarbonates used, the present composition releases $CO_2$ less vigorously. Thus, the present composition can be used in films as an active packaging structure. Because the functionality of the present composition is triggered by molecular, i.e., gaseous, oxygen, and because the composition of ambient air is nearly the same across different parts of the world, the performance of the present composition can be predicted more easily and accurately in a variety of regions and climate conditions around the world. From a commercial applicability perspective, this indicates that the present composition will likely be more tolerant to various end use application environments. From a manufacturability perspective, this aspect reduces the number of variations in production lines, while still being able to meet varying capacity requirements.

Moreover, the present composition benefits from its acidic pH. In short, the present composition, due in part to its use of organic acids as opposed to other substances, e.g., salts of organic acids, has an enhanced rate of absorbing oxygen and emitting carbon dioxide. In other terms, the present composition absorbs oxygen and emits carbon dioxide faster than known compositions. Moreover, known ascorbic acid compositions that include alkali salts of organic acids have demonstrated 9.995 cubic centimeters of oxygen absorbed per gram of sodium ascorbate in 7 hours at 25° C., while the present compositions which include organic acid have demonstrated 84.69 cubic centimeters of oxygen absorbed per gram of ascorbic acid in 7 hours at 22.4° C.

It should be appreciated that components of the present composition are designated in claims using the following convention: IUPAC name (common name) (chemical formula); or, when the IUPAC and common names are the same, IUPAC (chemical formula). Although well known to those of ordinary skill in the art, IUPAC is the acronym for "International Union of Pure and Applied Chemistry".

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A composition that absorbs oxygen and emits carbon dioxide in response to absorbing oxygen comprising:
    ascorbic acid;
    organic acid;
    a catalyst that promotes oxidation of the organic acid and emission of carbon dioxide; and
    a transition metal salt characterized by multiple oxidation states.

2. The composition of claim 1 wherein the organic acid is selected from: ethanedioic acid (oxalic acid) ($H_2C_2H_4$); 2,3-dihydroxybutanedioic acid (tartaric acid) ($C_4H_6O_6$); 2-Hydroxypropanoic acid (lactic acid) ($C_3H_6O_3$); hydroxybutanedioic acid (malic acid) ($C_4H_6O_5$); (Z)-butenedioic acid (maleic acid) ($C_4H_4O_4$); 2-hydroxypropane-1,2,3-tricarboxylic acid (citric acid) ($C_6H_8O_7$); propanedioic acid (malonic acid) ($C_3H_4O_4$); hydrates thereof; adducts thereof; and combinations thereof.

3. The composition of claim 1 wherein the catalyst is selected from: zinc chloride ($ZnCl_2$); aluminum sulfate ($Al_2(SO_4)_3$); magnesium chloride ($MgCl_2$); hydrates thereof; and combinations thereof.

4. The composition of claim 1 further comprising a base selected from: sodium hydroxide (NaOH); calcium hydroxide ($Ca(OH)_2$); magnesium hydroxide ($Mg(OH)_2$); and combinations thereof.

5. The composition of claim 1 wherein the transition metal salt is selected from: cupric sulfate (copper(II) sulfate) ($CuSO_4$); ferrous sulfate (iron(II) sulfate) ($FeSO_4$); manganese(II) chloride ($MnCl_2$); cobalt(II) chloride ($CoCl_2$); hydrates thereof; adducts thereof; and combinations thereof.

6. The composition of claim 1 further comprising:
    a promoter selected from: Ethylenediaminetetraacetic Acid, Disodium Salt, Dihydrate (disodium EDTA) ($Na_2EDTA$); Sodium oxalate ($Na_2C_2O_4$); phthalocyanine ($C_{32}H_{18}N_8$); (1R,2R,3S,4S,5R,6S)-cyclohexane-1,2,3,4,5,6-hexayl hexakis[dihydrogen (phosphate)] (phytic acid) ($C_6H_{18}O_{24}P_6$); a salt of phytic acid; a porphyrin; a phthalocyanine; an amino acid; a protein; and combinations thereof.

7. The composition of claim 1 further comprising:
    a carrier comprising a coating of the ascorbic acid, the organic acid, the alkaline material, the transition metal salt, and the water thereon,
    wherein the carrier is selected from: diatomaceous earth; silica gel; carbon; and combinations thereof.

8. A method of forming a blended composition that absorbs oxygen and emits carbon dioxide in response to absorbing oxygen comprising:
    a) mixing: ascorbic acid; an organic acid; a catalyst that promotes oxidation of the organic acid and emission of carbon dioxide; and a transition metal salt characterized by multiple oxidation states.

9. The method of claim 8 wherein the organic acid is selected from: ethanedioic acid (oxalic acid) ($H_2C_2O_4$); 2,3-dihydroxybutanedioic acid (tartaric acid) ($C_4H_6O_6$); 2-Hydroxypropanoic acid (lactic acid) ($C_3H_6O_3$); hydroxybutanedioic acid (malic acid) ($C_4H_6O_5$); maleic acid (maleic acid) ($C_4H_4O_4$); 3-carboxy-3-hydroxypentanedioic acid (citric acid) ($C_6H_8O_7$); propanedioic acid (malonic acid) ($C_3H_4O_4$); hydrates thereof; adducts thereof; and combinations thereof.

10. The method of claim 8 wherein the catalyst is selected from: zinc chloride ($ZnCl_2$); aluminum sulfate ($Al_2(SO_4)_3$); magnesium chloride ($MgCl_2$); hydrates thereof; and combinations thereof.

11. The method of claim 8 wherein the step of mixing comprises mixing a base selected from: sodium hydroxide (NaOH); calcium hydroxide ($Ca(OH)_2$); magnesium hydroxide ($Mg(OH)_2$); and combinations thereof.

12. The method of claim 8 wherein the transition metal salt is selected from: cupric sulfate (copper(II) sulfate) ($CuSO_4$); ferrous sulfate (iron(II) sulfate) ($FeSO_4$); manganese(II) chloride ($MnCl_2$); cobalt(II) chloride ($CoCl_2$); and combinations thereof.

13. The method of claim 8 wherein the step of mixing comprises mixing a promoter selected from: Ethylenediaminetetraacetic Acid, Disodium Salt, Dihydrate (disodium EDTA) ($Na_2EDTA$); Sodium oxalate ($Na_2C_2O_4$); phthalocyanine ($C_{32}H_{18}N_8$); (1R,2R,3S,4S,5R,6S)-cyclohexane-1,2,3,4,5,6-hexayl hexakis[dihydrogen (phosphate)] (phytic acid) ($C_6H_{18}O_{24}P_6$); a salt of phytic acid; a porphyrin; a phthalocyanine; an amino acid; a protein; and combinations thereof.

14. The method of claim 8 further comprising:
    b) coating a carrier with the blended composition; and,
    c) drying the coated carrier,
wherein the step of drying is, optionally, performed under vacuum.

15. A composition that absorbs oxygen and emits carbon dioxide in response to absorbing oxygen comprising:
    an oxygen absorbing material selected from: ascorbic acid; 1,2-dihydroxy aromatics; alpha-hydroxy ketones; and, combinations thereof, the oxygen absorbing material cyclically oxidizes and reduces;
    an organic acid;
    a catalyst that promotes oxidation of the organic acid and emission of carbon dioxide; and
    a transition metal salt characterized by multiple oxidation states.

* * * * *